US007048191B2

(12) United States Patent
Park et al.

(10) Patent No.: US 7,048,191 B2
(45) Date of Patent: May 23, 2006

(54) 4-STATE BAR CODE PRINTING AND READING SYSTEM AND METHOD FOR CONTROLLING THE SAME

(75) Inventors: Moon Sung Park, Taejon (KR); Jae Gwan Song, Taejon (KR); Jae Gak Hwang, Taejon (KR); Yun Seok Nam, Taejon (KR); Hye Kyu Kim, Seoul (KR); Chee Hang Park, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 1010 days.

(21) Appl. No.: 10/015,807

(22) Filed: Dec. 17, 2001

(65) Prior Publication Data

US 2002/0145751 A1 Oct. 10, 2002

(30) Foreign Application Priority Data

Jan. 19, 2001 (KR) ................................ 2001-3223

(51) Int. Cl.
*G06K 7/10* (2006.01)

(52) U.S. Cl. ................................................ 235/462.01

(58) Field of Classification Search ........... 235/462.01, 235/462.07, 462.08, 462.15
See application file for complete search history.

(56) References Cited

U.S. PATENT DOCUMENTS 5,387,783 A * 2/1995 Mihm et al. ................ 235/375
5,420,403 A * 5/1995 Allum et al. ............... 235/375
5,479,515 A * 12/1995 Longacre, Jr. ............... 380/54

(Continued)

OTHER PUBLICATIONS

Hideki Bando; Dep. Dir. Mech. & Computer Systems Japan Post; 13th International Confrence on Postal Automation; pp. 1-4.

*Primary Examiner*—Daniel Stcyr
*Assistant Examiner*—Daniel A. Hess
(74) *Attorney, Agent, or Firm*—Mayer, Brown, Rowe & Maw LLP

(57) ABSTRACT

A 4-state bar code printing and reading system for use in physical distribution-related services such as mail pieces, receptacles, reception and management forms or the like, and a method for controlling the system are disclosed. The 4-state bar code printing system comprises a bar code information acquiring section for acquiring, storing and determining a mail piece sorting information; an information recorded density enhancing section for evaluating a value of a character, by using of a compression method depending upon a type of the information and digit, which are determined by the bar code information acquiring section; an input information encoding section for arranging the values of the bars produced by the information recorded density enhancing section in order of values of bars of the 4-state bar code, and dividing the values into groups each consisting of 3 bars; an error correcting codeword producing section for producing an error correcting codeword based on the result of the information encoding section the input value of an error correcting level; and a print frame producing section for arranging the error correcting codeword produced from the error correcting codeword producing section and the data produced from the information recorded density improving section in order of a start bar, a data, an error correcting codeword, and a stop bar, to print a 4-state bar code print font on a mail piece.

17 Claims, 14 Drawing Sheets

U.S. PATENT DOCUMENTS

| | | | | | |
|---|---|---|---|---|---|
| 5,602,382 | A | * | 2/1997 | Ulvr et al. | 235/462.02 |
| 5,619,027 | A | * | 4/1997 | Ackley | 235/462.01 |
| 5,984,174 | A | * | 11/1999 | Kato et al. | 235/375 |
| 6,012,638 | A | * | 1/2000 | Ackley et al. | 235/462.01 |
| 6,126,074 | A | * | 10/2000 | He et al. | 235/454 |
| 6,321,986 | B1 | * | 11/2001 | Ackley | 235/462.01 |
| 6,484,933 | B1 | * | 11/2002 | Zimmerman et al. | 235/375 |

* cited by examiner

4-STATE BAR CODE PRINTING AND READING SYSTEM AND METHOD FOR CONTROLLING THE SAME

BACKGROUND OF THE INVENTION

1. Field of the Invention

The present invention relates to a 4-state bar code printing and reading system for use in physical distribution-related services such as mail pieces, receptacles, reception and management forms or the like, and a method for controlling the system.

2. Background of the Related Art

Up to now, a bar code has generally been used to facilitate automation in sorting small and large commercial mail pieces, the bar code including useful information which is associated with different patterns of varying stripes with decimal digit or decimal digits and alphabetic characters. In particular, since the bar code used in the automatic mail pieces sorting process has to be constructed to satisfy a requirement such as a size of the mail piece, a printed location of the bar code, and the like, it cannot contain a lot of information. In case of U.S. Postal Service (USPS), a bar code of Postal Numeric Encoding Technique (POSTNET) is printed on a right lower corner for automatically sorting the mail pieces, while a PLANET bar code which the POSTNET bar code is inversely converted on a right upper corner of a zip code region to provide an additional service.

With the above system, there is a problem of increasing the cost for printing and reading the bar code as much as twice. In addition, in order to provide another service, another bar code will additionally be printed on the mail piece. Further, there is another method that the customer prints a two-dimensional bar code on the mail piece for freepost or metered mail.

In the above case, since at least two bar codes must to be read, it increases the time required to read the bar code, thereby decreasing the amount of mail pieces to be processed. In addition, since a separate reader for each bar code has to be used, there is another drawback that the expenses for processing the mail pieces are increased. Further, in case that a bar code label is printed and adhered by customers (mailers) to encode sorting information, if the label is out of the straight or is disordered, there is another problem large volumes of mail pieces which are to be manually verified are provided.

Among conventional methods for reading a bar code, in case that the bar code is sloped, two methods have been proposed as follows: a slope value of the bar code is evaluated, and then the bar code is read by inversely rotating the image by the slope angle; and the bar code is read by evaluating a center axis value of one bar code. According to the above reading methods, because all of the information within the range which is divided into areas based on the center axis has to be searched, too much time is required to acquire the information for reading the bar code.

In addition, according to one prior method for tracking the slope value, if a diverse image is provided between the bars, it is impossible to read the bar code due to the variation of the thickness of the bar and the space value, or since many reference data are provided for correcting the error, an error correcting level has to be set to a high point. Therefore, in order to record much information using the bar code, a surface area to be printed is expanded. And also, in order to improve a reading efficiency, the number of codewords for correcting an error is increased. Specifically, the diverse image produced due to the bad print of the bar code causes the reading efficiency to be decreased. Furthermore, there is no a method for restoring an erased region. The mail pieces which are not automatically sorted are increased, thereby requiring the manual verification process.

Meanwhile, a Reed-Solomon which is proposed by Reed and Solomon is an RS code which is a kind of BCH (Bose-Chaudhuri-Hochquenghem) code capable of correcting an error of a concatenated pattern. The RS code can correct an error of sporadic pattern (substitution error) and an error of concatenated pattern (erasure error), and is very important code used widely. Therefore, the RS code has been studied by many coding theorists.

If the Reed-Solomon algorism is employed to correct the error, although there is no an error, a function of the error correction is called and performed. The location of the error is deviated from a range of an error correction depending upon the start position of erased bar or a unit of bar. Therefore, since the error is not corrected, manual verification process is required.

SUMMARY OF THE INVENTION

Accordingly, the present invention is directed to a 4-state bar code printing system and a method for controlling the system that substantially obviate one or more problems due to limitations and disadvantages of the related art.

An object of the present invention is to provide a 4-state bar code printing system and a method for controlling the system, in which more information can be recorded in the 4-state bar code for automatically sorting mail pieces, and a reading efficiency on the 4-state bar code speed can be improved to effectively execute the mail piece handling.

To achieve the object and other advantages, according to one aspect the present invention, there is provided a 4-state bar code printing system comprising: a bar code information acquiring section for acquiring or inputting a mail piece sorting information such as a personal identification information, an article information, a sent date, a zip code, and a delivery order code, and storing and determining the acquired or inputted mail piece sorting information; an information recorded density enhancing section for evaluating a value of a character to produce values of bars, by using of a compression method depending upon a type of the information and digit, which are determined by the bar code information acquiring section; an input information encoding section for arranging the values of the bars produced by the information recorded density enhancing section in order of values of bars of the 4-state bar code, dividing the values of the bars into groups as a unit of three bars in order of the inputted information, and if the values is not divided into groups as a unit of three bars, adding the number of insufficient bars to the values, to allow the values of the bars to be a multiple of 3; an error correcting codeword producing section for producing an error correcting codeword by use of an Exclusive-OR bit operation method, based on the result of the information encoding section the input value of an error correcting level, of which a coefficient value of a index function is standardized; and a print frame producing section for arranging the error correcting codeword produced from the error correcting codeword producing section and the data produced from the information recorded density improving section in order of a start bar, a data, an error correcting codeword, and a stop bar, to print a 4-state bar code print font on a mail piece.

According to another aspect of the present invention, there is provided a 4-state bar code printing system comprising: means for acquiring an image of a bar code from a mail piece; image transforming means for transforming the acquired image into a binary image information, and transferring a coordinate information for interpreting a bar code image to image feature value acquiring means; the image feature value acquiring means for acquiring a directional coordinate value for calculating a slope value of the bar code, and a coordinate value associated with a bar code region by a feature value of the bar code, based on the coordinate information produced from the image feature value; bar code region extracting means for evaluating a first slope value based on the binary image information obtained by the image transforming means and the slope value of the bar code obtained by the image feature value acquiring means, and determining a searching region of a tracker bar code based on the production of a correct final slope value by tracking a location of a tracker bar; information sorting means for extracting a uniform region by calculating a distribution of thickness of the bars and space values, among the information on the feature value of the bar determined by the bar code region extracting means, or extracting the feature value of the bar by calculating a weight value based on a variation of the thickness of the bar and the space value acquired when tracking the tracker bar, and storing the coordinate value for reading the bar code; bar region discriminating means for examining a start bar and a stop bar based on the coordinate value obtained by the bar feature value extracting means, producing a center axis on an upper and lower end of the tracker bar by applying a predetermined slope angle, if the bar is sloped, and producing a bar location information by evaluating the coordinate value for extracting the value of the bar; erasure error detecting means for calculating number of location of erased bar based on the result obtained by the bar feature value extracting information sorting means, and identifying existence of an erased error; substitution error detecting means for 1) extracting the value of the bar by use of only a coordinate value of a space, except for the coordinate region of a white bar, when extracting the value of the bar, based upon the values extracted by the bar region discriminating means, 2) after sorting a numeric, alphabetic, and Korean alphabetic letter applied region, determining whether the value of the bar is deviated from a symbol feature value, and 3) if the error exists, detecting the number and position of the error; an error correcting codeword comparing section for, if a service pattern value corresponding to the value of the bar produced by the bar region discriminating means exists, comparing a length of the bar with that of the bar of the corresponding service pattern, determining whether the value of the service pattern does not exist and only mail piece automatic sorting code exists, and if the length of the bar coincides with that of the bar of the corresponding service pattern, classifying the bar into a data region and an error correcting codeword region, and after encoding the bar as a data value, determining whether the produced value coincides with the read error correcting codeword; and information frame codeword interpreting means for, if at the error correcting codeword comparing means the produced value coincides with the read error correcting codeword, interpreting the data information to perform an automatic sorting process of the mail piece, and storing the read result to be accessed.

According to still another aspect of the present invention, there is provided a method for printing 4-state bar code, comprising the steps of: 1) acquiring a mail piece sorting information from a mail piece, and storing and determining the mail piece sorting information; 2) evaluating a value of a character to produce values of bars, by use of a compression method depending upon a type of the information and digit; 3) arranging the values of the bars produced by the step 2 in order of values of bars of the 4-state bar code, dividing the values of the bars into groups as a unit of three bars in order of the inputted information, and if the values is not divided into groups as a unit of three bars, adding the number of insufficient bars to the group, to allow the values of the bars to be a multiple of 3; 4) producing an error correcting codeword by use of an Exclusive-OR bit operation method, based on the result of the step 3, of which a coefficient value of a index function is standardized; and 5) arranging the error correcting codeword produced from the step 4 and the data produced from the step 2 in order of a start bar, a data, an error correcting codeword, and a stop bar, to print a 4-state bar code print font on a mail piece.

According to further still another aspect of the present invention, there is provided A method for reading a 4-state bar code, the method comprising the steps of: 1) to acquiring an image of a bar code from a mail piece; 2) transforming the acquired image into a binary image information, and evaluating coordinate values for a minimum value and a maximum value based on a horizontal line of the mail piece; 3) acquiring a directional coordinate value for calculating a slope value of the bar code, and a coordinate value for a bar code region by a feature value of the bar code, based on the coordinate information produced from the step 2; 4) determining an examining region of a tracker bar code based on the binary image information and the slope value of the bar code, each obtained by the steps 2 and 3; 5) extracting a uniform region by calculating a distribution of thickness of the bar and a space value, among the information on the feature value of the bar, and storing the coordinate value for reading the bar code; 6) examining a start bar and a stop bar based on the coordinate value obtained from the step 5, producing a center axis on an upper and lower end of the tracker bar by applying a predetermined slope angle, if the bar is sloped, and producing a bar location information by evaluating the coordinate value for extracting the value of the bar; 7) calculating number of location of erased bar based on the result obtained from the step 6, and identifying existence of an erased error; 8) extracting the value of the bar by use of only a coordinate value of a space except for a coordinate region of a white bar, when extracting the value of the bar, based upon the values extracted from the step 6, after sorting the numeric, alphabetic, and Korean alphabetic letter applied region, determining whether the value of the bar is deviated from a symbol feature value, and if the error exists, detecting the number and position of the error; 9) if a service pattern value corresponding to the value of the bar produced from the step 6 exists, comparing a length of the bar with that of the bar of the corresponding service pattern, determining whether the value of the service pattern does not exist and only mail piece automatic sorting code exists, and if the length of the bar coincides with that of the bar of the corresponding service pattern, classifying the bar into a data region and an error correcting codeword region, and after encoding the bar as a data value, determining whether the produced value coincides with the read error correcting codeword; and 10) if the produced value coincides with the read error correcting codeword at the error correcting codeword comparing means, interpreting the data information to perform an automatic sorting process of the mail piece, and storing the read result to be accessed.

The 4-state bar code printing and reading system of the present invention can effectively expand the range of the error correction by use of a method for enhancing information recorded density and a method for reading the bar code at high speed, thereby effectively executing the process of automatically sorting the mail pieces.

Specifically, the 4-state bar code printing and reading system of the present invention employs a method for enhancing the information to more information in the 4-state bar code for automatically sorting the mail pieces. The error correcting codeword is produced and printed for detecting and correcting the error happened due to the damage of the compressed information or the poor print quality. The image is acquired to effectively read the bar code image printed by the printing process. The location and slope of the bar code, the feature value of the bar, and the like are produced in the course of the binarizing process. Only the region of the bar code image is stored in the temporary memory. In order to facilitate the read of the 4-state bar code, a boundary line of the tracker bar for defining the upper and lower parts is produced. The coordinate values for easily detecting the value of the bar are set. The weight value of the bar is obtained by use of the predetermined coordinates to obtain the values of the 4-state bar code. Based upon the results thus obtained, the error detecting and correcting process is performed.

The bar code reading process employs a method for effectively obtaining the location and slope of the bar code, and the distribution of the thickness of the bars and the space values, in the course of binarizing the original image. After the results are applied to the reference pattern of the bar code by use of the slope angle, a method for evaluating the value of the bar, and a method for minimizing the number of image searching times to obtain the upper and lower values on the basis of the tracker bar which is a feature of the 4-state bar code are employed.

At that time, the reference value needed when obtaining the weight value of the bar is set to a boundary line between the upper and lower parts of the tracker bar, and is applied to a searching process on the basis of the slope value.

On the binarizing process for extracting the region of the bar code image, if the region of which is read as a white pixel is happened at least two stages, the bar code is searched by skipping the bar in a unit of 2 to 10 horizontal lines. At that time, if the disperse image exists, a process for applying a reference range value for the thickness, height, and coordinate value of 4-state bar, the direction of the coordinate value variation, and the space value is employed. In addition, a process of detecting the start and stop bars of the 4-state bar code may be employed to identify the region of the bar code. Furthermore, if the tracker bar exists, the image may be regarded as the 4-state bar code on the basis of the obtained value. Also, a method of using the feature of the start and stop bars and total number of the bars, which are defined every service pattern, is applied.

With the procedure, the 4-state bar code may be read as the image information. If the bar located between the start and stop bars is damaged or deleted, the number information of the erased error is calculated by examining how many bars exist in the deleted space, so that it is used as a basis information for the error correction.

There is provided another method comprising the steps of: determining whether the image is correctly read by the weight values of the bar code; if the number of the bars in the data region is correct, comparing the features associated with the symbology location of the numeric and alphabetic character, to determine whether the error exists; and if the error does not exist, producing the error codeword by use of the symbology value of the read data.

If the error correcting codeword is identical, the above process of detecting and correcting the error will be omitted. In other words, if the error correcting codeword is not identical, the Reed-Solomon algorism is called, so that the function of the detecting and correcting the error may be performed.

Prior to the comparison of the error correcting codeword with the data symbology value, if deleted or error bars over 13 are detected, it is determined that the image is rejected as an unreadable state. If the error bars up to 12 are detected, the values of the read bar code symbology are divided into groups each consisting of three bars. If the error bars are found in six or more groups, it is determined that the image is rejected as an unreadable state.

If it is readable, in other words, if the error bars exist in four groups, the error detecting and correcting function are performed by the existing method. If the error bars exist in five groups, a group having many errors is divided into an error group by comparing the dimension of the leftmost or rightmost symbols, and the error detecting and correcting function are performed by producing the syndrome value for H=0, A=1, D=2, T=3 at the location on which only one symbol is error. An occasion where the number of bars is identical by comparing the results obtained the above process is happened, and the error can be corrected by use of the value.

The 4-state bar code printing and reading system according to the present invention may be applied for use in physical distribution-related services such as mail pieces or documents, and may be applied to a method for automatically sorting the articles.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiment of the present invention, examples of which are illustrated in the accompanying drawings.

Figure 1:
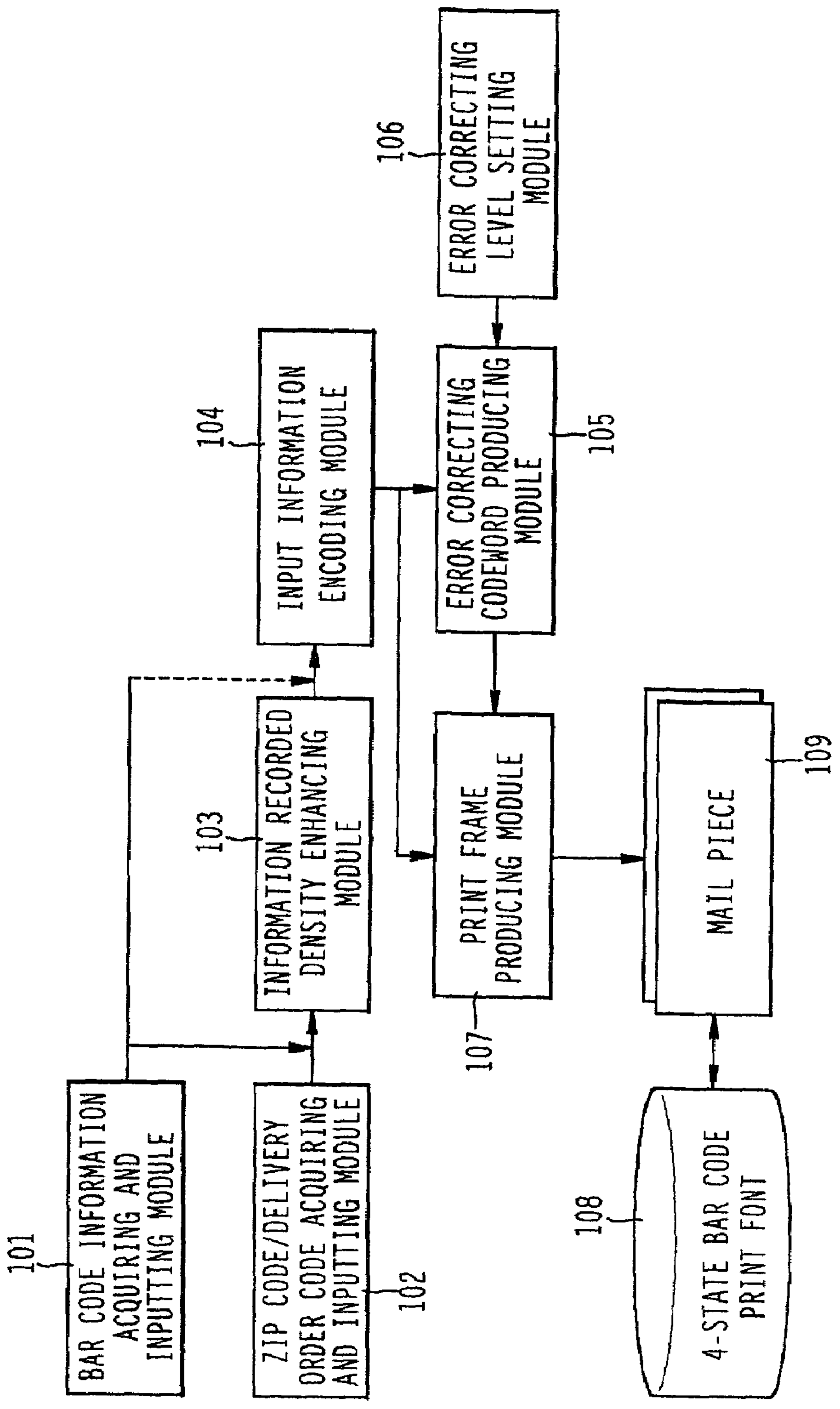
FIG. 1 is a diagram view of a 4-state bar code printing system according to one preferred embodiment of the present invention.

FIG. 1 is a diagram view of a 4-state bar code printing system according to one preferred embodiment of the present invention.

Firstly, information to be represented in the form of the 4-state bar code is automatically acquired or inputted, the information comprising customer's information (for example, personal identification number (ID), ID of article, sent date, name of sender, name of recipient, and the like), and information (zip code, delivery order code, and the like) required for automatically sorting mail pieces. Such the information may selectively be used depending upon necessary services. The information may be inputted to a customer's information acquiring and inputting module 102, or may automatically be obtained by the zip code delivery order code acquiring and inputting module 102. An information recorded density enhancing module 103 performs a compression method depending upon the type of information such as numeric character, alphabetic character, Korean alphabetic character or the like by use of a method for enhancing information recorded density, thereby producing a value of the bar. In case of the numeric character, the information recorded density can be enhanced by a following procedure. The compression of the numeric or alphabetic information of the bar code is performed by a modulo N method as follows, in which a decimal digit 6-digit code is provided one example of the numeric information:

1) substituting the numeric information into decimal number (for example, zip code 123 456 is substituted with 123456);

2) dividing the substituted value by $64^3$;

3) setting an integer of the result obtained from the item 2 to a compressed data value 1;

4) evaluating a difference between the value of the item 3 and the value of the item 2, and dividing the difference by $64^2$; and 5) applying values obtained by repeating the same procedures as those of items 3 and 4 using $64^1$ and $64^0$. Table 1 is one example of the information compression.

Equation 1

$$Num_{(d3)} = int\left(\frac{Num_{10}}{64^3}\right)$$

$$Num_{(d2)} = int64^3\frac{\left(\frac{Num_{10}}{64^3} - Num_{(d3)}\right)}{64^2} = int\left(\frac{Num_{10}}{64^2} - 64Num_{(d3)}\right)$$

-continued $$Num_{(d1)} = int64^2\frac{\left(\frac{Num_{(d3)}}{64^2} - Num_{(d2)}\right)}{64^1} = int\left(\frac{Num_{(d3)}}{64} - 64Num_{(d2)}\right)$$

$$Num_{(d0)} = int64^1\frac{\left(\frac{Num_{(d2)}}{64^1} - Num_{(d1)}\right)}{64^0} = int(Num_{(d2)} - 64Num_{(d1)})$$

TABLE 1

| | Applied | Operation Results | | | |
|---|---|---|---|---|---|
| | Value | 1 Digit | 2 Digit | 3 Digit | 4 Digit |
| 6-Digit Zip Codes | 999999 | 3.8147 | 52.14 | 8.9844 | 63 |
| Value of Bar | | 3 | 52 | 8 | 63 |
| Total number of bars | 9 | 4-state 1 bar | 4-state 3 bars | 4-state 2 bars | 4-state 3 bars |

The results requires that the number of the bars prior to the compression is 12 to 18 bars, but the information recorded density is represented by 9 bars with the operation method. In addition, in case that the information is the alphabetic character, if it is in consideration of a method indicating only capital letters, 26 alphabetic characters are employed. Therefore, a method for optimizing the information density is performed by following procedures:

1) substituting the alphabetic information into decimal number using a formula $V_n = b_n 27^n + \ldots + b_3 27^3 + b_2 27^2 + b_1 27^1 + b_0 27^0$;

2) dividing the value of $V_n$ by $64^n, \ldots, 64^0$ which are classified into a unit of n-, . . . , 5-, 4-, 3-, 2-, 1-digit, and in case of classifying the values into 4-digits, evaluating a value of each bar code character using following equation 2 ($V_{4n}$ means that the former 4-digits are selected from the $V_n$); and 3) repeating the same procedure as that of item 2 using the rest of digit. In the equation 2, $V_{Rest}$ is designated by the rest of digit.

Equation 2

$$Num_{(d3)} = int\left(\frac{V_{Rest}}{64^3}\right)$$

$$Num_{(d2)} = int64^3\frac{\left(\frac{V_{4n,Rest}}{64^3} - Num_{(d3)}\right)}{64^2} = int\left(\frac{V_{4n,Rest}}{64^2} - 64Num_{(d3)}\right)$$

$$Num_{(d1)} = int64^2\frac{\left(\frac{Num_{(d3)}}{64^2} - Num_{(d2)}\right)}{64^1} = int\left(\frac{Num_{(d3)}}{64} - 64Num_{(d2)}\right)$$

$$Num_{(d0)} = int64^1\frac{\left(\frac{Num_{(d2)}}{64^1} - Num_{(d1)}\right)}{64^0} = int(Num_{(d2)} - 64Num_{(d1)})$$

1) substituting the alphabetic information into decimal number (for example, if the alphabetic character is 'UVMLZ', a value of each capital letter is $21b_4$, $22b_3$, $13b_2$, $12b_1$, $26b_0$.);

2) evaluating $27^4 \times 21 + 27^3 \times 22 + 27^2 \times 13 + 27^1 \times 12 + 26 = 11{,}603{,}114$ using the values of the bar code characters;

3) setting values of 1st and 2nd digits, 11, to a value of the first bar code character, since the value of the 1st and 2nd digits at the item 2 may be set to 16 modulo value on the basis of a maximum value;

4) classifying the latter 6-digits, which is excluded the former 1st and 2nd digits from the value of the item 2, into two groups each consisting of 3-digits; and 5) applying values obtained from each 3-digits using the 64 modulo method, thereby calculating 9, 27 from the value of 603, and 1, 50 from 114 which is the next digit of the value 603.

Since the values evaluated by the above method are 11, 9, 27, 1, and 50, if the evaluated values are represented in order of 4 state 2 bar($V_4$=11), 2 bar($V_3$=9), 3 bar($V_2$=27), 2 bar($V_1$=1), and 3 bar($V_0$=50), 5 capital letters can be represented by 12 bars. In other words, in case that one capital letter is represented on the basis of 4-state 4 bar and 3 bar, 15 to 20 bars are required. However, in case of employing the above method, five capital letters may be represented by 12 bars.

In case of Korean Alphabet completion letters, since one Korean alphabetic letter may be represented by 4-state 6 bar, the execution of following example can shorten a length of the bar in view of a value of 0 to 48:

1) substituting the Korean alphabetic letter into decimal number using a formula $V_n = b_n 50^n + \ldots + b_3 50^3 + b_2 50^2 + b_1 50^1 + b_0 50^0$;

2) dividing the value of $V_n$ by $256^3, \ldots, 256^0$ which are classified into a unit of n-, . . . , 5-, 4-, 3-, 2-, 1-digit, and in case of classifying the values into groups each consisting of 4-digits, evaluating a value of each bar code character using following equation 3 ($V_{4n}$ means that the former 4-digits are selected from the $V_n$); and Equation 3

$$Num_{(d3)} = int\left(\frac{V_{4n}}{256^3}\right)$$

$$Num_{(d2)} = int256^3 \frac{\left(\frac{V_{4n}}{256^3} - Num_{(d3)}\right)}{256^2} = int\left(\frac{V_{4n}}{256^2} - 256Num_{(d3)}\right)$$

$$Num_{(d1)} = int256^2 \frac{\left(\frac{Num_{(d3)}}{256^2} - Num_{(d2)}\right)}{256^1} = int\left(\frac{Num_{(d3)}}{256} - 256Num_{(d2)}\right)$$

$$Num_{(d0)} = int256^1 \frac{\left(\frac{Num_{(d2)}}{256^1} - Num_{(d1)}\right)}{256^0} = int(Num_{(d2)} - 256Num_{(d1)})$$

3) repeating the same procedure as that of item 2 using the rest of digit. In following equation 4, $V_{Rest}$ is designated by the rest of digit.

Equation 4

$$Num_{(d3)} = int\left(\frac{V_{Rest}}{64^3}\right)$$

$$Num_{(d2)} = int64^3 \frac{\left(\frac{V_{Rest}}{64^3} - Num_{(d3)}\right)}{64^2} = int\left(\frac{V_{Rest}}{64^2} - 64Num_{(d3)}\right)$$

$$Num_{(d1)} = int64^2 \frac{\left(\frac{Num_{(d3)}}{64^2} - Num_{(d2)}\right)}{64^1} = int\left(\frac{Num_{(d3)}}{64} - 64Num_{(d2)}\right)$$

$$Num_{(d0)} = int64^1 \frac{\left(\frac{Num_{(d2)}}{64^1} - Num_{(d1)}\right)}{64^0} = int(Num_{(d2)} - 64Num_{(d1)})$$

By employing such a method, the information recorded density of the Korean Alphabet may be improved.

1) substituting the character information into decimal number (for example, supposing that the Korean Alphabet '구원 (Kuwon)' has a value of $23b_3$, $22b_2$, $38b_1$, $37b_0$.);

2) evaluating $50^3 \times 23 + 50^2 \times 22 + 50^1 38 + 37 = 2{,}931{,}937$ using the values of the bar code characters;

3) dividing the former digit '2,931' from the item 2 by $256^2$, to obtain an integer value of the quotient;

4) multiplying a difference between the actual value calculated at the item 3 and the integer value by 256;

5) dividing the result of the item 4 by 256, and repeating the items 3 and 4; and 6) dividing the latter digit '937' from the item 2 by 256, and evaluating the value by performing the same procedures as those of the items 3 and 4.

If the values evaluated by the above method are represented in order of 4-state 2 bar ($V_3$=1), 4 bar($V_2$=213), 1 bar($V_1$=3), and 4 bar($V_0$=42), two Korean alphabetic letters can be represented by 11 bars. In other words, in case that one Korean alphabetic letter is represented on the basis of 4-state 8 bar and 6 bar, 12 to 16 bars are required. However, in case of employing the above method, one Korean alphabetic letter may be represented by 11 bars.

The method for improving information recorded density may be extended on the basis of the digits of inputted information. In order to encode values of the bars produced by the method applied to the information recorded density enhancing module 103, an input information encoding module 104 arranges the inputted information in order of inputted information to divide the information into groups in a unit of values of three bars, and rearranges the inputted information by determining an arbitrary constant (for example, setting the value of bars to 3) by the number of remaining bars which are not divided into groups as described above. The values may produce an error correcting codeword using the values of bars which are divided into three groups in a unit of bar. An error correcting level setting module 106 may selectively use values calculated by a basic polynomial for producing the error correcting codeword, so that an error correcting codeword level may be set to 1 and 2. An error correcting codeword producing module 105 produces the error correcting codeword according to the value of the error correcting level. A print frame producing module 107 generates a print frame by rearranging the produced error correcting codeword and the data which is determined by the method for improving the information recorded density in order of start bar, data, error correcting codeword, and stop bar, thereby producing the print frame. A mail piece printing module 109 prints a 4-state bar code print font 108 on the mail piece.

Figure 2A:
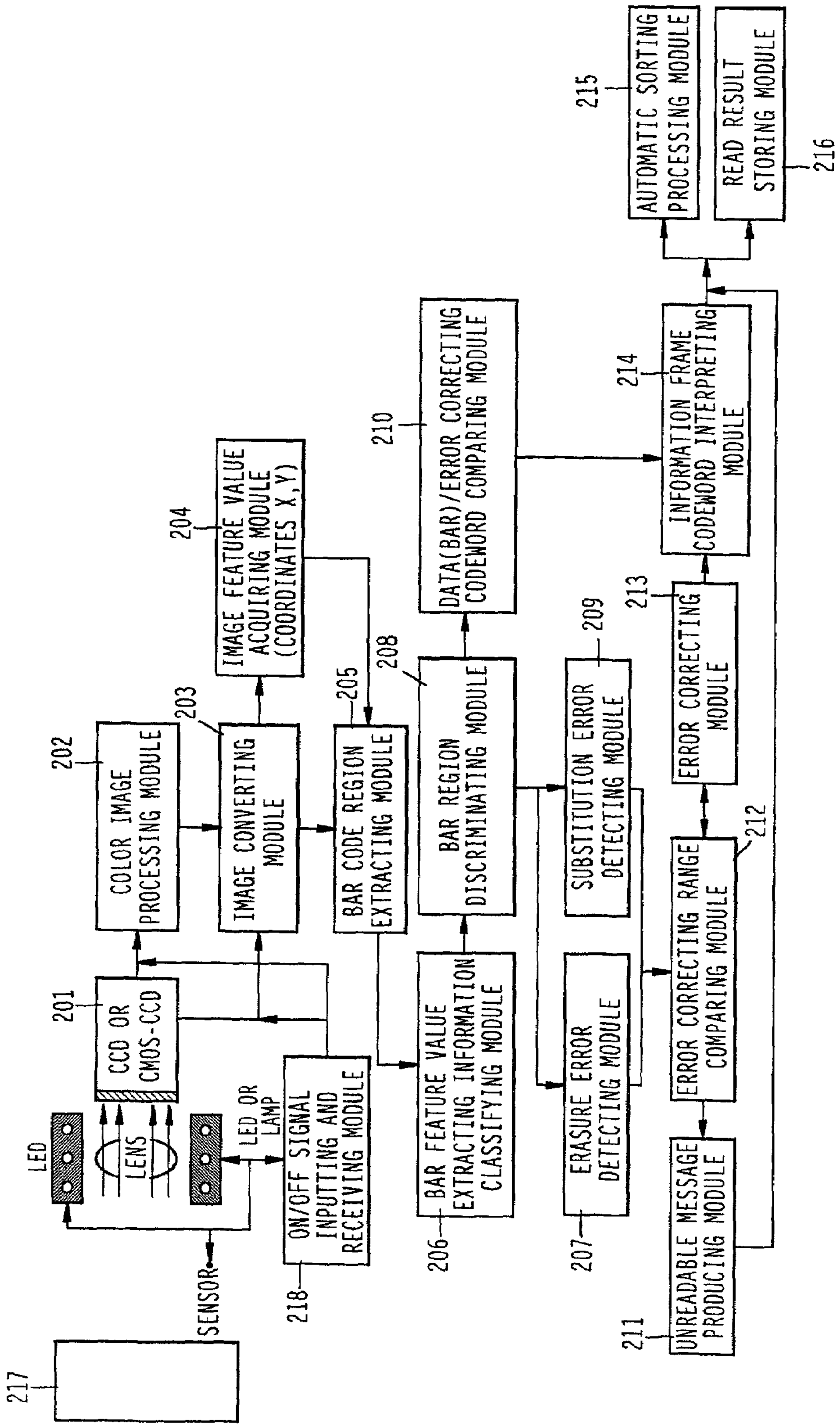
FIG. 2A is a schematic view of a 4-state bar code read system according to the present invention.

FIG. 2A is a schematic view of a 4-state bar code read system according to the present invention.

The 4-state bar code reading system according to the present invention performs steps of: reading an information of a bar code pattern through a binary coding process of an image information via means for obtaining the image information which is represented by the 4-state bar code; storing the read result to transfer it to an information system; and automatically sorting the mail pieces according to the read result.

An image acquiring module 210 such as a charge-coupled device (CCD) camera, a CCD scanner, a CMOS-CCD, or the like requires an image of the mail piece with the bar code printed thereon. If the acquired image is a color image, prior to performing the binary coding process, a color image processing module 202 converts the bar code of the acquired color image into information of black and white pattern using a color signal. An image converting module 203 searches the information acquired in the form of black and white image, converts it into a binary image information, and transfers a coordinate information required to interpret the bar code image to an image feature value acquiring module 204. The image feature value acquiring module 204 acquires coordinate values having a directional value for calculating inclination value of the bar code which is a coordinate information, and coordinate values associated with a bar code region which is defined by a feature value of the bar code. A bar code extracting module 205 determines a tracker bar code examining region in view of the inclination value of the bar code on the basis of the information produced when converting the binary image. A bar feature value extracting information classifying module 206 calculates a distribution of thickness of the bars and space values among the information associated with the feature value of the bar depending upon the result of the bar code region extracting module 205 to extract a weight value for a uniform region and a variation, sets and stores the coordinate value in view of the weight value of the thickness and space value of the bar associated with the position of the bar for reading the bar code. A bar region discriminating module 208 examines the start bar and the stop bar based on the coordinate values of the feature value of the bar. In case that the bar code is sloped, the module 208 evaluates the correct slope value of the 4-state bar code by tracking the tracker bar using a predetermined angle value, and produces a centered axis of the tracker bar using the angle value. And also, the module 208 sets a coordinate values in view of the weight value of the thickness of the bar and the space value associated with the position of the bar for evaluating the coordinate value to extract the value of bar, and produces position information of each bar.

An erasure error detecting module 207 calculates the number of position of erased bars on the basis of the result of a bar feature value extracting information classifying module 206, and determines whether the erased error exists. A substitution error detecting module 209 extracts the value of the bar by use of only coordinate value of a space except for the coordinate region of a white bar in course of extracting the values of the bar, on the basis of the values extracted at the process of the bar region discriminating module 208. After discriminating the numeric, alphabetic, and Korean alphabetic letter regions, the module 209 determines whether the value of the bar is deviated from a symbol feature value, and if the error exists, detects the number and position of the error. If a service pattern value corresponding to values of the bars produced by the result of the bar region discriminating module 208 exists, a comparing module 210 compares a length of the bar with that of the bar of the corresponding service pattern, and determines whether the value of the service pattern does not exist and only mail piece automatic sorting code exists. If the length of the bar coincides with that of the bar of the corresponding service pattern, the module 210 classifies the bar into a data region and an error correcting codeword region. And then, after encoding the bar as a data value, the module 210 determines whether the produced value coincides with the read error correcting codeword. In case of coinciding with each other at the comparing module 210, an information frame codeword interpreting module 214 interprets the data information. An automatic sorting processing module 215 performs the automatic sorting process of mail pieces. A read result storing module 216 stores the read result, so that the read result can be accessed via a physical distribution information managing system.

If an error exists in the course of the erasure error detecting module 207 or substitution error detecting module 209, an error correcting range comparing module 212 compares the information on the position and number of the erasure and the information on the number of a substitution error with the error correcting range. If as the result of the error correcting range comparing module 212 the error correction is impossible, an unreadable message is produced by an unreadable message producing module 211, and after the error is automatically sorted into a sorting reject range by the automatic sorting processing module 215, a read result storing module 216 stores the read result of the unreadable reason. If the error correction is within a range capable of correcting the error, the error is corrected by an error correcting module 213, and a data information is interpreted by the information frame codeword interpreting module 214. After the automatic sorting process is carried out by the automatic sorting processing module 215, the read result storing module 216 stores the read result, so that the read result can be accessed via a physical distribution information managing system.

If the error correction is impossible as the result of the error correcting range comparing module 212, the unreadable message is produced by the unreadable message producing module 211, and after the error is automatically sorted into the sorting reject range by the automatic sorting processing module 215, the read result storing module 216 stores the read result of the unreadable reason. And then, the comparing module 210 and the information frame codeword interpreting module 214 further interpret a compressed information.

As described above, the coordinate value for reading the bar code is produced at an initial stage, and methods for producing two center axes for reading the bar code and producing the read information using the coordinate value associated with the bar position are applied. The present invention can effectively detect and process the error.

Meanwhile, another method for, when a target object is positioned at the front of the CMOS-CCD or before the target object is arrived at the front thereof, detecting a read target image 217 using a sensor, obtaining a signal for controlling the start of bar code read by operating an LED 219, and transferring the signal to an on/off signal inputting and receiving module 218 can be employed. In order to facilitate the read of the target object, the on/off signal inputting and receiving module 218 scans a light to a bar dotted read target object by operating the LED 219, so that a read surface can be obtained as an image having uniform brightness by the CMOS-CCD 201.

In addition, the read target object is fixed, and if the on/off signal inputting and receiving module 218 receives a read command, the read of the bar code is performed by acquiring the fixed image. If the moving read target object is continuously projected, a method for always maintaining the LEDs in an on state can be employed.

Figure 2B:
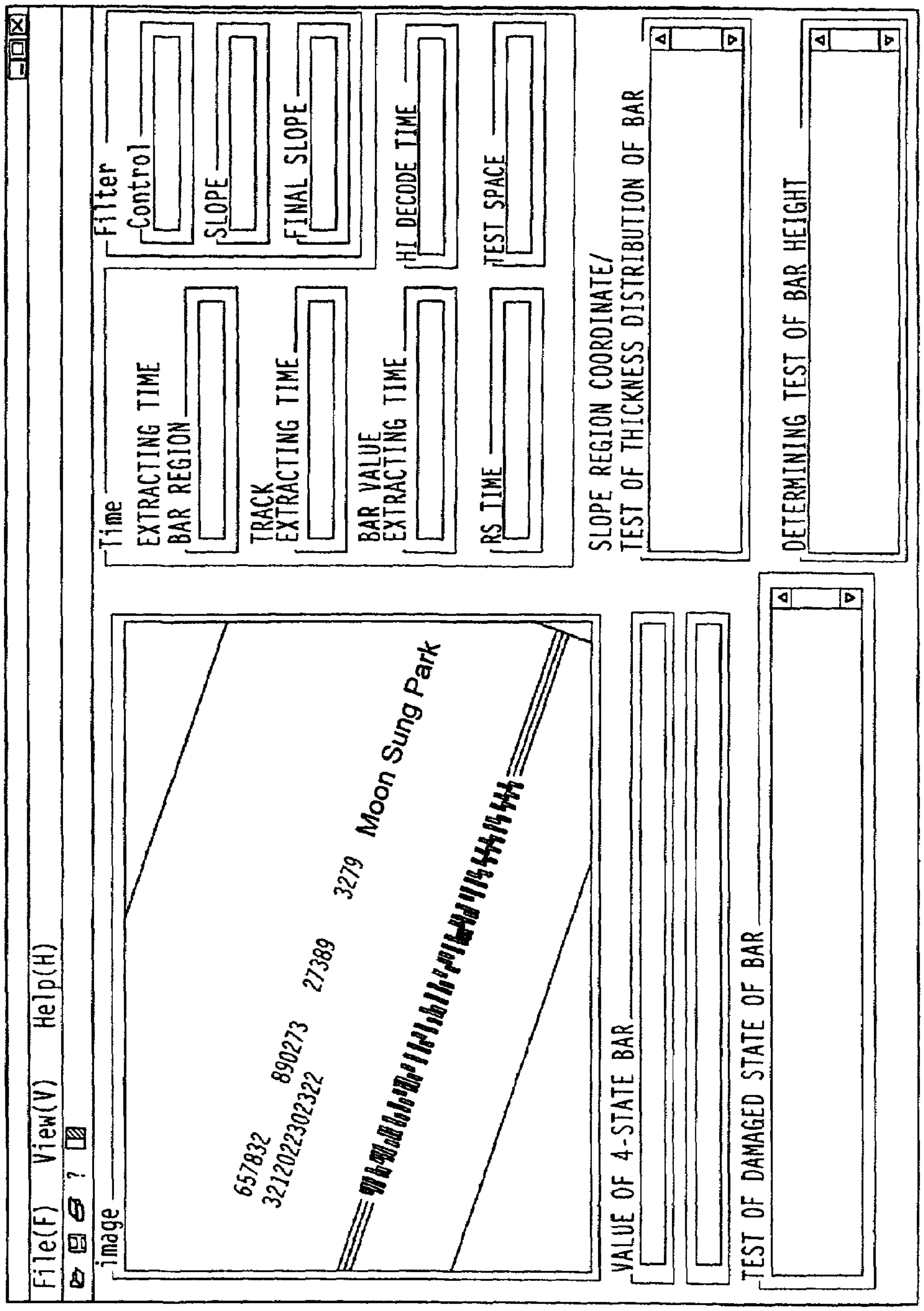
FIG. 2B is a view illustrating one result of the read test of the 4-state bar code by a reading method according to the present invention.
Figure 2C:
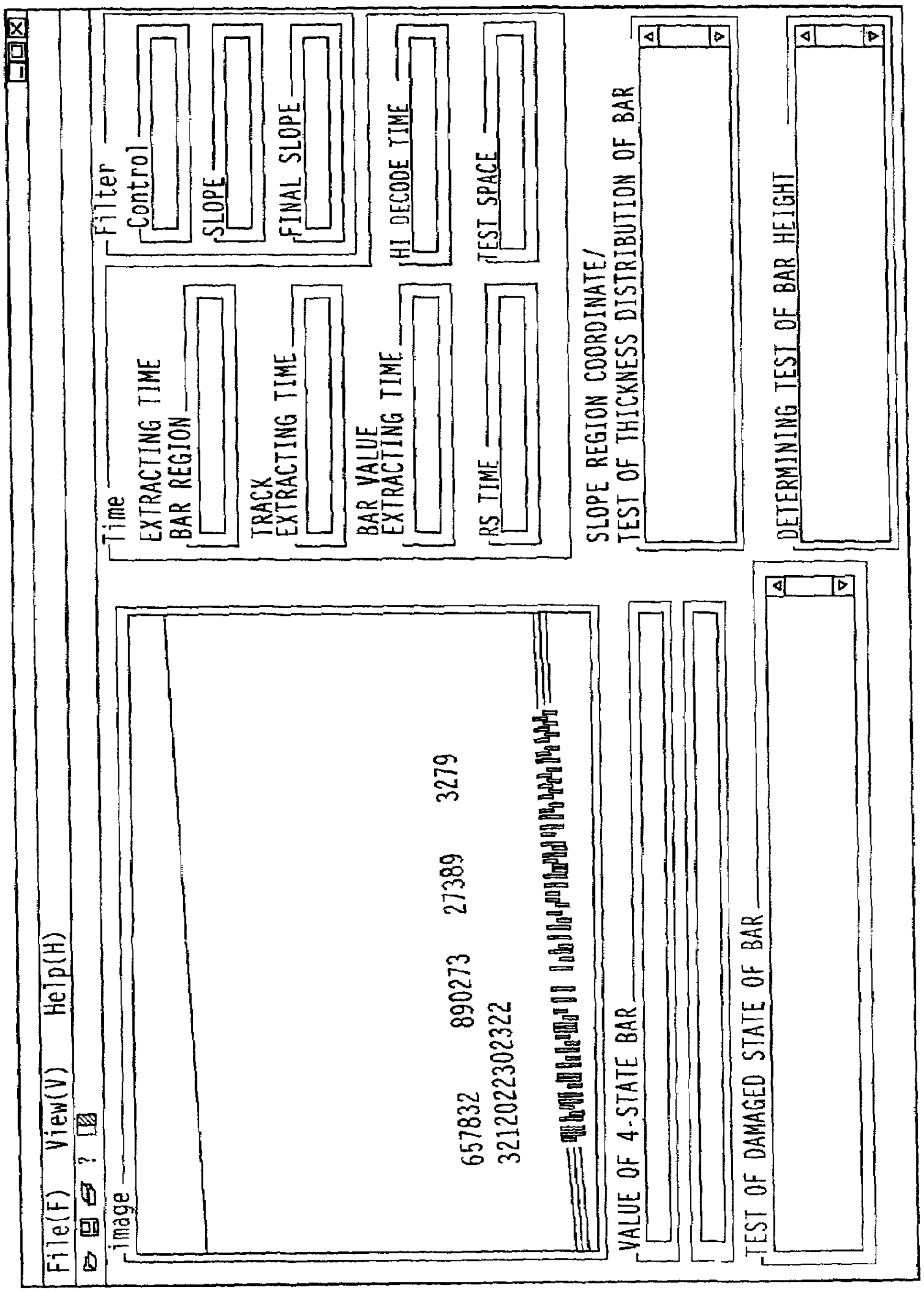
FIG. 2C is a view illustrating another result of the read test of the 4-state bar code by a reading method according to the present invention.

FIGS. 2B and 2C show the results of reading an image of a 4-state bar code obtained by a CMOS-CCD through the method according to the present invention. As will be seen from FIGS. 2B and 2C, the 4-state bar code can be effectively read via the bar code reading system according to the present invention.

Figure 3:
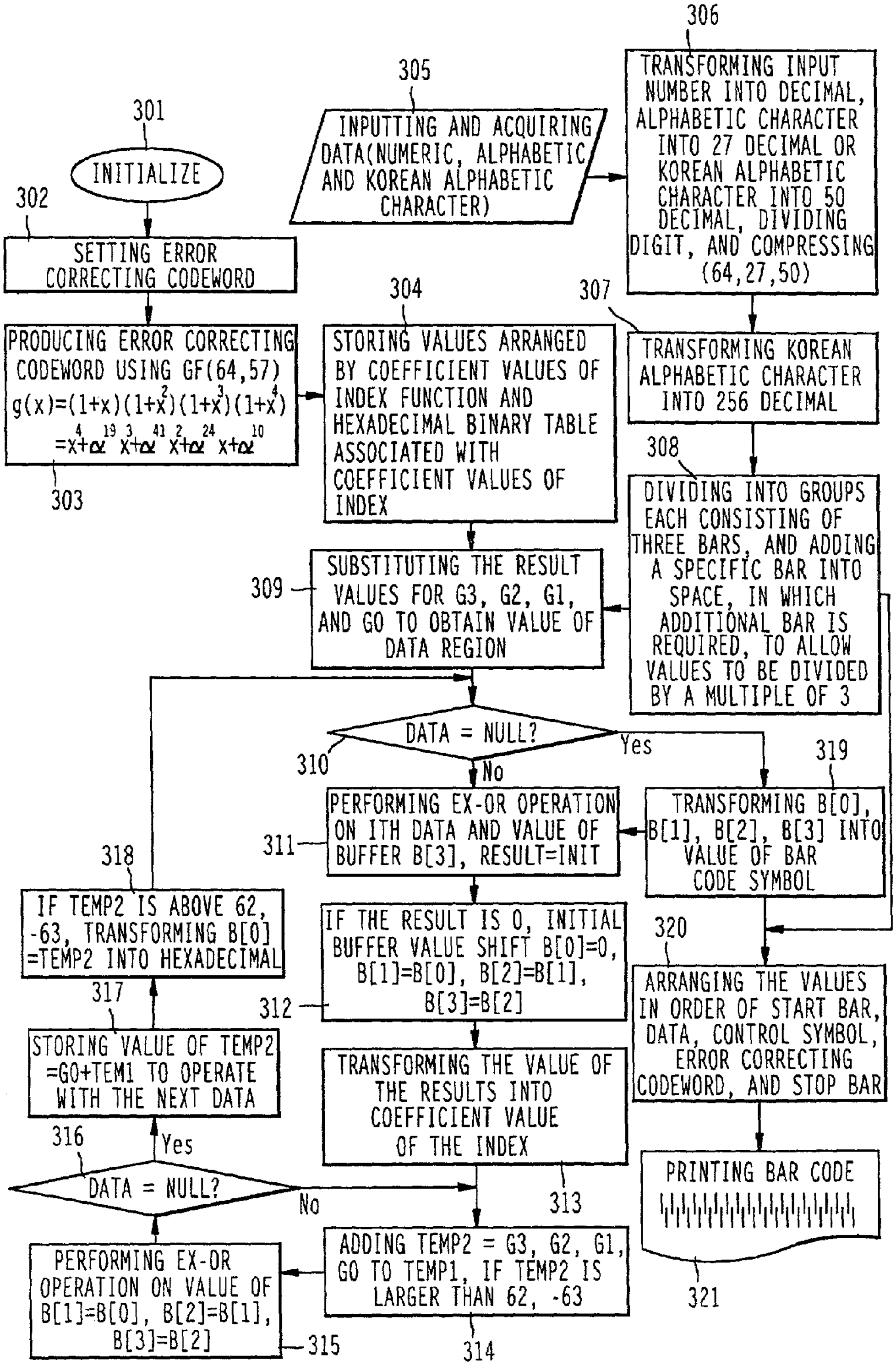
FIG. 3 is a flowchart showing the process of the 4-state bar code printing system according to the present invention.

FIG. 3 is a flowchart showing the process of the 4-state bar code printing system according to the present invention, in which the information on the 4-state bar code according to the present invention is effectively produced and recorded, and an error correcting codeword is produced.

The 4-state bar code printing system is initialized in step 301, and an error correcting level is set to produce an error correcting codeword in step 302. A polynomial such as equation 5 to produce the error correcting codeword using the error correcting level is produced in step 303.

$$g(x)=(1+x)(1x^2)(1+x^3)(1+x^4)=x^4+\alpha^{19}x^3+\alpha^{41}x^2+\alpha^{24}x+\alpha^{10} \qquad \text{Equation 5}$$

Hexadecimal binary table (table 3) associated with values of Galois field (GF) (64) and a reference table (table 1) in which hexadecimal values are arranged by coefficient values of index are produced and stored in step 304.

TABLE 2

| Index | 16 Bit | HEX | EXP |
|---|---|---|---|
| 0 | (000000) | 0x00 | NULL |
| 1 | (100000) | 0x20 | $\alpha^0$ |
| 2 | (010000) | 0x10 | $\alpha$ |
| 3 | (001000) | 0x08 | $\alpha^2$ |
| 4 | (000100) | 0x04 | $\alpha^3$ |
| . | . | . | . |
| . | . | . | . |
| . | . | . | . |
| 60 | (101111) | 0x2f | $\alpha^{59}$ |
| 61 | (100111) | 0x27 | $\alpha^{60}$ |
| 62 | (100011) | 0x23 | $\alpha^{61}$ |
| 63 | (100001) | 0x21 | $\alpha^{62}$ |

TABLE 3

| Bit | HEX | BTI | EXP | Index |
|---|---|---|---|---|
| (000000) | 0x00 | 0 | −1 | −1 |
| (000001) | 0x01 | 1 | $\alpha^5$ | 5 |
| (000010) | 0x02 | 2 | $\alpha^4$ | 4 |
| (000011) | 0x03 | 3 | $\alpha^{10}$ | 10 |
| . | . | . | . | . |
| . | . | . | . | . |
| . | . | . | . | . |
| (111100) | 0x3c | 60 | $\alpha^{18}$ | 18 |
| (111101) | 0x3d | 61 | $\alpha^{40}$ | 40 |
| (111110) | 0x3e | 62 | $\alpha^{56}$ | 56 |
| (111111) | 0x3f | 63 | $\alpha^{58}$ | 58 |

Meanwhile, as will be known from the above description with reference with FIG. 1, the information recorded in the bar code is acquired or inputted. In step 303, the coefficient value of α index corresponding to each $X^0$ to $X^4$ is produced. An information compressing operation is performed according to the pattern of information and the number of digits in steps 306 and 307. In particular, in step 306, input number is transformed into decimal, and after alphabetic letter is transformed into 27 decimal or Korean alphabetic letter is transformed into 50 decimal, the information is compressed with digit being divided. In step 307, Korean alphabetic letter is transformed into 256 decimal. Values of the bars resulted from steps 306 and 307 are sorted into groups each consisting of three bars, a proper number of bars are added so that the number of the bar in the data space becomes to be a multiple of 3, in step 308. In step 309, the result values obtained from step 305 are substituted for g3, g2, g1, and g0 to obtain a value of a data region. In step 310, a space value for an error correcting codeword to be It produced at an encoding process, and in order to identify the process of producing the error correcting codeword, it determines whether a data is null. If the data is null, the process proceeds to step 319. If the data is not null, the process proceeds to step 311.

In step 311, $b_0$, $b_1$, $b_2$ and $b_3$ buffers are initialized to produce the number of the data groups and the error correcting codeword. In step 312, the first data is performed by an Exclusive-OR operation with hexadecimal value and $b_3$ value. If the result is zero, the value position of the buffer is moved. In step 313, the value of the operation results is transformed into a coefficient value of the index. In step 314, the value Temp1 obtained from step 313 and g3 are performed by an addition operation (Temp2=g3+Temp1), and if the result value of step 314 is a decimal number more than 62, 63 is subtracted from the result value. In step 315, if the result of step 314 is a decimal number lower than or equal to 62, the buffer value before the transform and the buffer value of the operation result are performed by a hexadecimal Exclusive-OR operation. In step 316, the operation of g2, g1 and g0 is performed by repeating the steps 314 and 315 at four times. In order to perform the next data operation on the result value of step 316, Temp1 of step 314 is added to g0, and the result is stored in Temp2, in step 317. If the result of Temp2 is a decimal number more than 62, 63 is subtracted from the operation result, and b0=Temp2 is transformed into hexadecimal, in step 318. And then, the process proceeds to step 310. Therefore, the preparation for encoding the next data is performed, and the steps 311 to 318 are repeatedly performed from the next data to the final data.

If the process of the final data is completed and d5 the data becomes null in step 310, values of $b_0$, $b_1$, $b_2$ and $b_3$ are transformed into a symbol value of the 4-state bar code, thereby producing the error correcting codeword value, in step 319. In order to print the bar code, the values are arranged in order of value of the start bar, value of the data bar, value of the error correcting codeword, and value of the stop bar in step 320. After that, an image corresponding to value of each bar is called and printed on a postal envelope or a label, in step 321. The transformation of the result of hexadecimal Exclusive-OR operation into decimal number and the transformation of the decimal number into the hexadecimal are performed by the information stored in a memory in a step 304, and then the operation is performed.

Figure 4A:
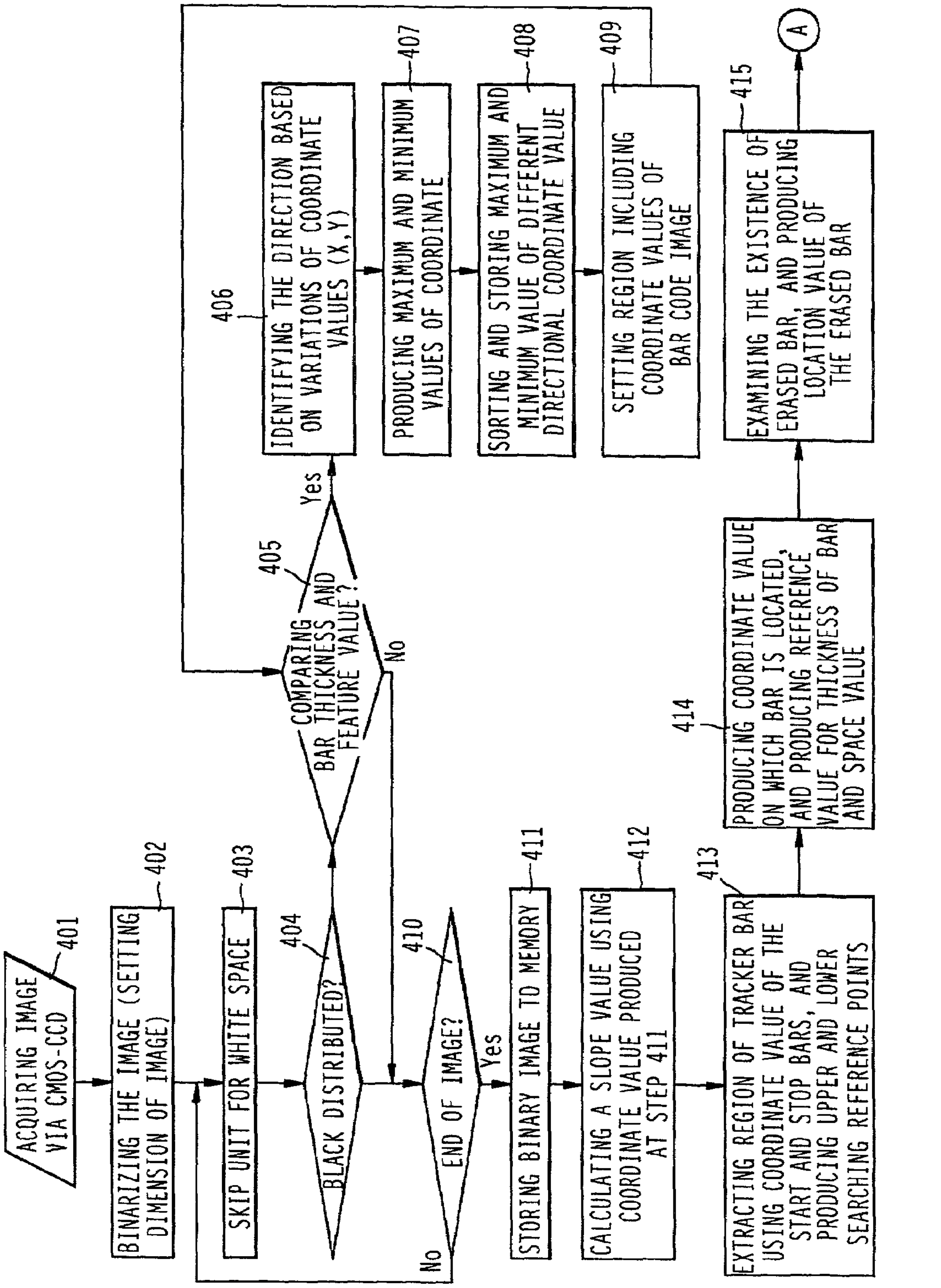
FIGS. 4A and 4B are flowcharts showing the process of acquiring the image information and extracting the feature value for reading the bar code in the flowchart of FIG. 3.
Figure 4B:
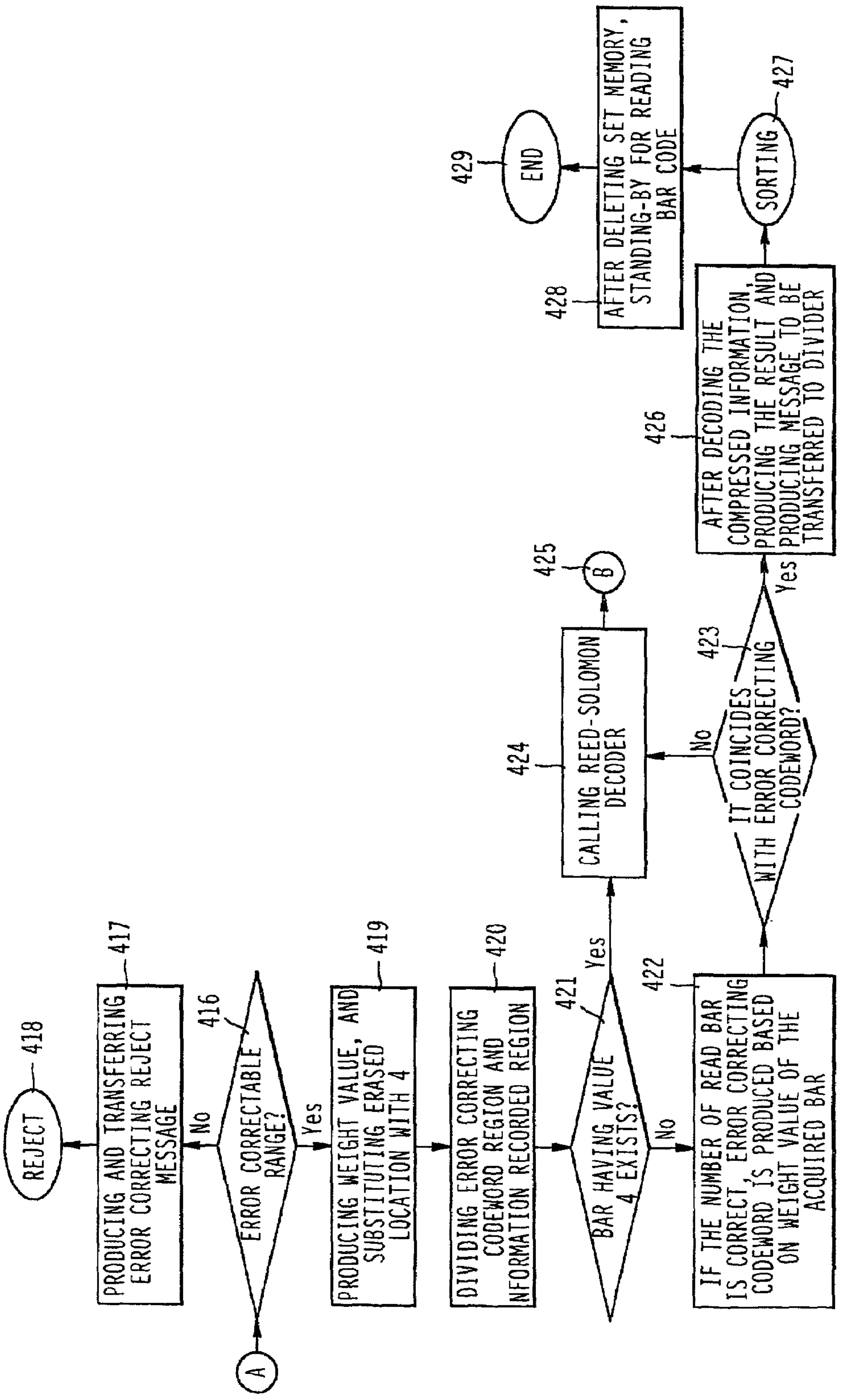

FIGS. 4A and 4B are flowcharts showing the process of acquiring the image information and extracting the feature value for reading the bar code in the flowchart of FIG. 3.

In step 401, the image of the postal envelope on which the bar code is printed is acquired via an interface such as a scanner, a CCD camera, or a CMOS-CCD, and is stored in the memory. In step 402, the location of the bar code is searched in the course of binarizing the image information, AD and the coordinate value is obtained. Upon obtaining the image of the bar code, the image among color images or black and white images is divided into two equal upper and lower parts by use of the coordinate value set to an address region of the postal envelope, and a size of the region which is searched from the upper to the lower and from the lower to the upper is set. In step 403, if a white space is occurred in twice or more times, the region is searched by moving it in a unit of 2 to 4 pixels. In step 404, a location at which a black pixel is occurred is identified. In step 405, a size value of which the coordinate values for the value of the black pixel existing on a horizontal line are consequently produced is compared with a range of thickness value of the bar, and the white space value is compared with a spacing value of the bar, so that the image is continuously searched in an upward or downward direction from a coincided horizontal line.

In case of continuously searching the image according to the result of step 405, maximum and minimum values of the pixels on the horizontal line are obtained, and it determines whether a direction of which the maximum and minimum values are changed is increased or decreased, in step 406. The maximum value and the minimum value of a same directional (increase) coordinate among the values obtained in step 406 are stored in step 407. The maximum value and the minimum value of a different directional (decrease) coordinate are stored in step 408. In case of a range of bar code image, the minimum value and the maximum value of the horizontal line are stored in step 409. Therefore, during searching the image, the binary process is performed.

The examination on an end of the image is performed in step 410. If the end of the image is found in step 410, a read target region of the bar code is set by use of values classified into the bar code regions on the basis of the maximum and minimum values of the horizontal line and the maximum and minimum values of the vertical line, and the image is stored in the memory, in step 410. It compares with variations of the coordinate values thus obtained, thereby calculating a sloping direction and angle in step 412.

In step 413, by applying a slope value to a range corresponding to the minimum value of the horizontal line and a difference between the maximum value and the minimum value of the vertical line, it determines whether the same bar as the start bar exists, while by applying a slope value to a range corresponding to the maximum value of the horizontal line and a difference between the maximum value and the minimum value of the vertical line, it determines whether the same bar as the stop bar exists. If the start bar and the stop bar are found, in order to evaluate the minimum and maximum value for the upper and lower coordinate values of the tracker bar by use of the coordinate values, the slope value of the 4-state bar code is correctly reevaluated by tracking the coordinate values of the tracker bar, and two reference lines for searching values of the bars are produced on the basis of the slope value. In step 414, referring to the result of step 413, a criterion for a thickness of the bar and a criterion for a space value are set by setting the thickness of the bar and a range with a constant space are set, and a coordinate value on which the bar has to be located is set in view of the upper and lower center lines of the tracker bar and the direction and angle of slope, thereby calculating values of the bar. In step 415, in order to determine whether the black pixel is exited in the corresponding coordinate in course of identifying the value of the bar, in view of the direction and angle value of the slope and the criterion of the coordinate values obtained from step 414, an identifier is produced for representing a state of which the location value of the bar is erased in relative to the coordinate in which the black pixels do not exist in a center coordinate value between the upper and lower center axes of the corresponding coordinate and the black pixel does not exist when examining the upper and lower center axes by use of the direction and angle value of the slope.

In step 416, it determines whether the number of bars erased from step 415 is above 13. If yes, the error correction is impossible. In step 417, the error correcting message is produced, and is transferred to a sorter. In step 418, the mail piece is classified into a sorting reject partition. In step 420, the number of the erased errors is below 12, the value of the erased bar is set to 4, and a location value is stored. In step 420, the remaining values except for the start bar and the stop bar are sorted into a data and an error correcting codeword in course of calculating the values of the bar in steps 415 and 416.

In step 421, it determines whether the value among sorted data and error correcting codeword, of which is set to 4, exists. In step 422, if not, the error correcting codeword is produced by use of the data value. In step 423, it determines whether the produced error correcting codeword is coincided with the error correcting codeword of step 420. If the produced error correcting codeword is coincided with the error correcting codeword of step 420, the error correcting codeword is restored to a pre-compressed data by value of the bars of the data region in step 426. And then, the data is automatically sorted in step 427. In step 428, the information on the read result is stored, so that the sorting state information can be inspected. If in step 423 the produced error correcting codeword is not coincided with the error correcting codeword of step 420, a Read-Solomon decoder for the error correction is called in step 424. In addition, if the bar having 4 value exists in step 421, a Reed-Solomon decoder for the error correction is called in step 424.

Figure 5A:
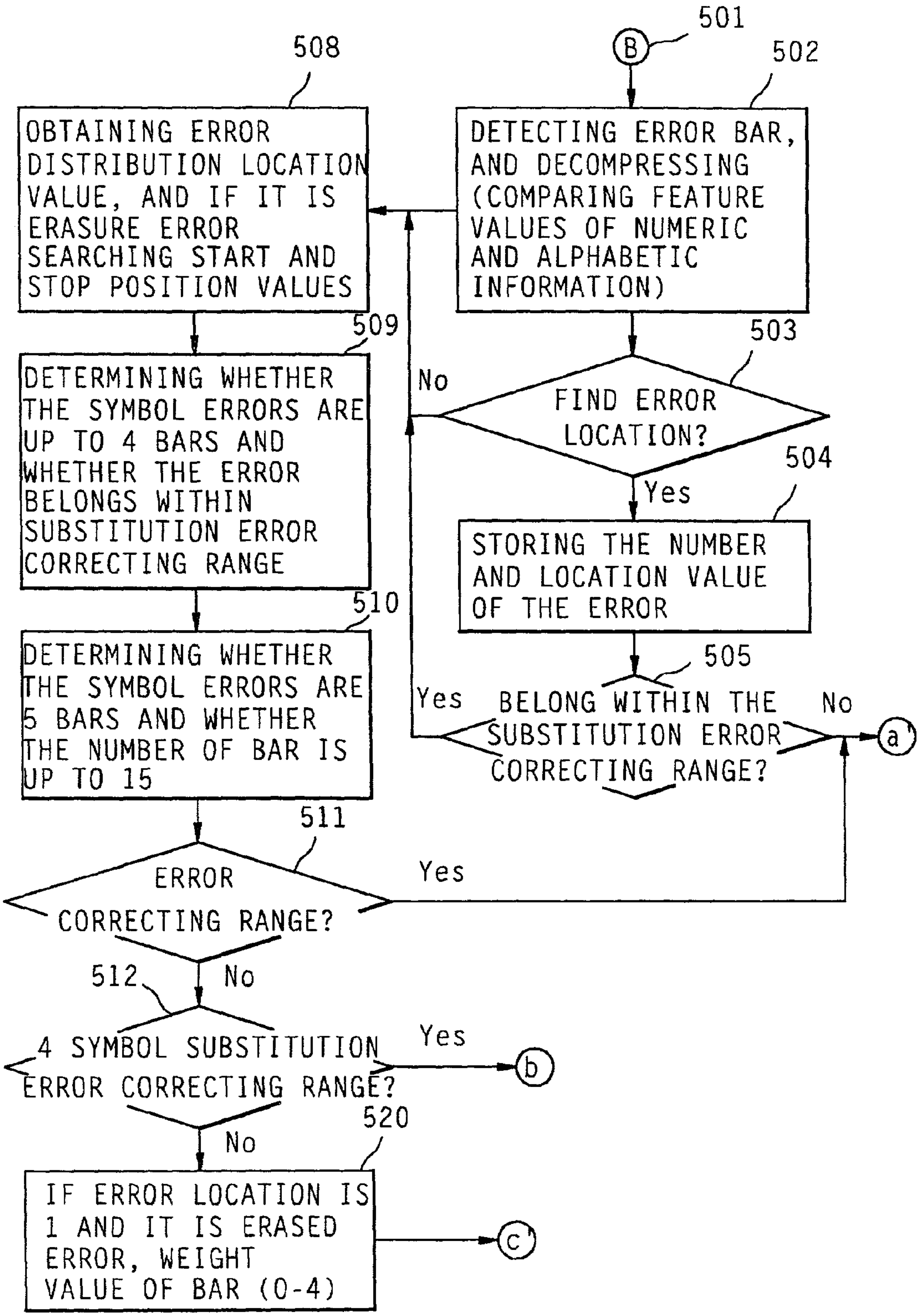
FIGS. 5A, 5B and 5C are flowcharts showing the process of detecting and correcting the error in the flowchart of FIG. 3.
Figure 5B:
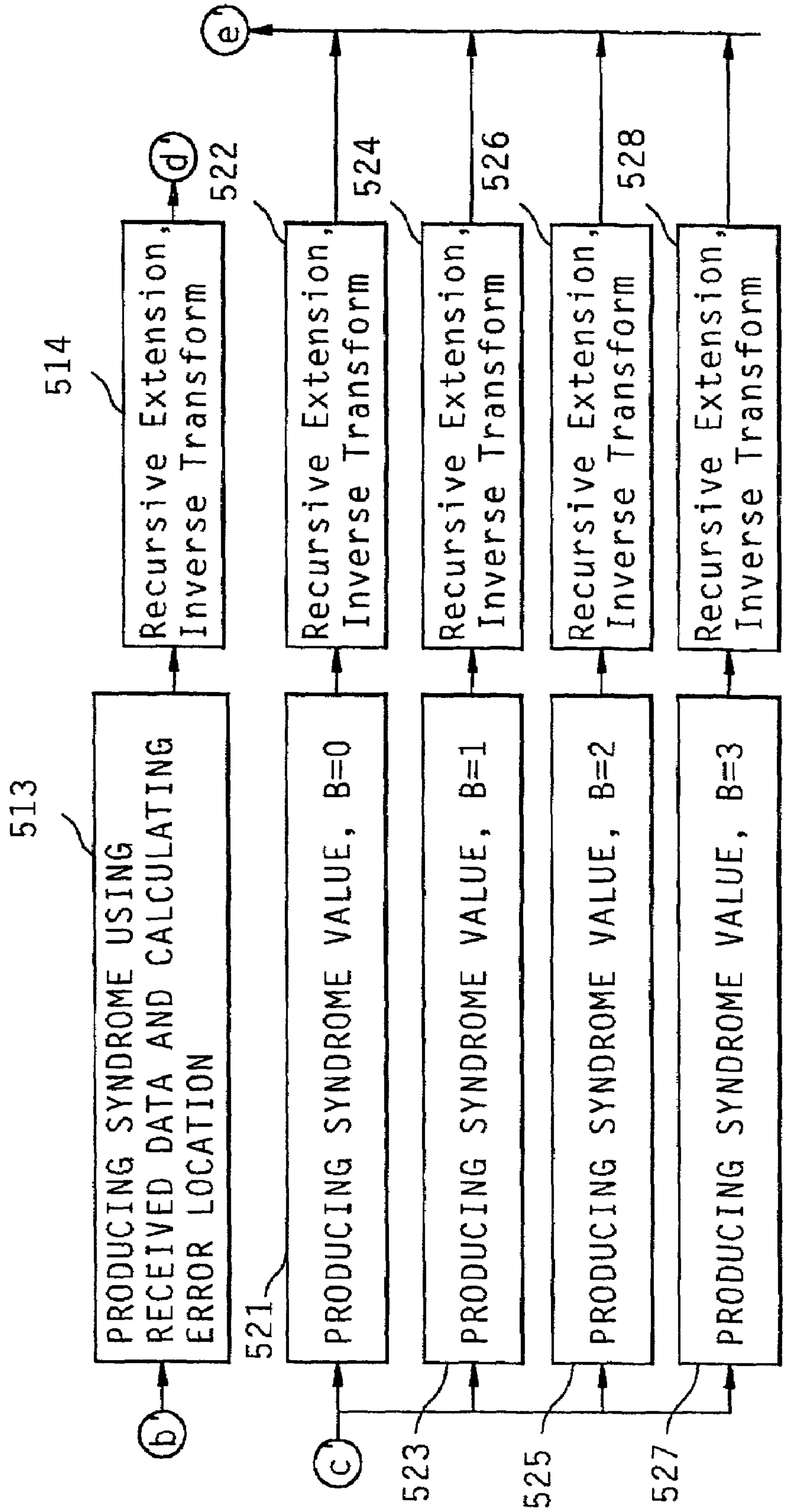
Figure 5C:
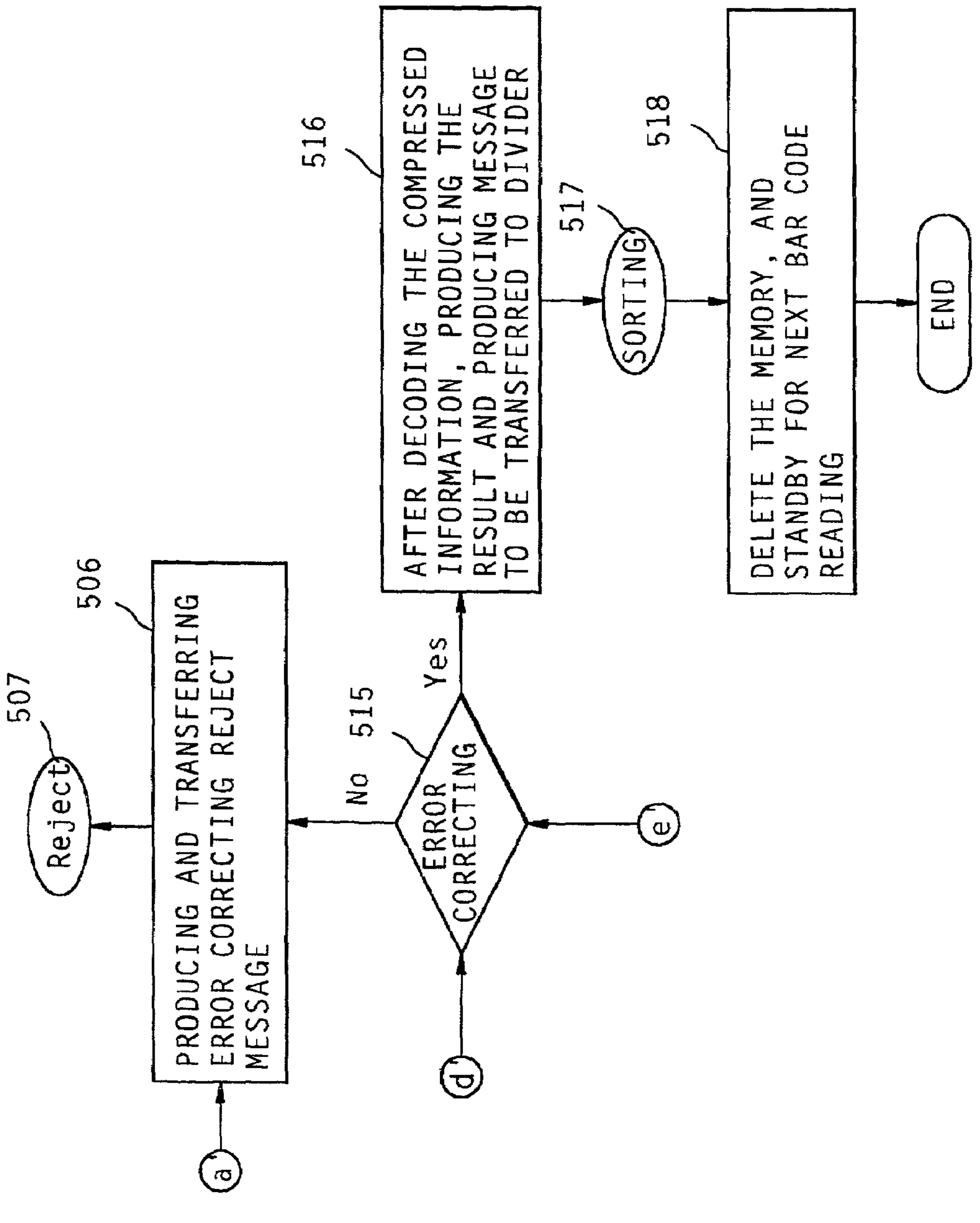

FIGS. 5A, 5B and 5C are flowcharts showing the process of detecting and correcting the error in the flowchart of FIG. 3. If only the error correction is required in the course of reading the 4-state bar code information according to the present invention, the process of FIGS. 5A, 5B and 5C is performed to detect and correct the error.

In step 501, after the Reed-Solomon algorism of an error correcting algorism is called by the procedure of FIGS. 4A and 4B, the error is corrected. In step 502, after the error correcting codeword is restored to a pre-compressed data by value of the bars of the data region, the data is compared with the location of unused bars and the comparative information to represent the numeric character, alphabetic character, and Korean alphabetic character. For example, in case that the numeric character is represented by the 4-state 2 bar, there are feature patterns of bars from 0 to 9. In case of 9, value of the first bar is 2, and value of the second bar is 1. In other words, in case that value of the first bar is 2, there is only the second bar having 0 or 1 value.

In step 503, it finds an error location. If there is an error due to the features, the location value of the error is stored in step 504. It determines whether the location value is within a substitution error correcting range in step 505. If the location value is not within a substitution error correcting range, the error correcting reject message is produced, and is transferred to the auto sorter, in step 506. The mail piece is sorted into a sorting reject partition in step 507. If the location value is within a substitution error correcting range in step 507 or if the error is not found in step 503, by comparing the location values of the erased bar and the substitution error location values to exclude the overlapped location value, actual error location value, the location of the erasure error, and the value of the bar are rearranged, in step

508. It determines whether the location value of the erasure or substitution error among the values resulted from step 508 is below four symbologies and is within a range of the substitution error correction, in step 509. If the symbology is five errors, it determines whether the number of the bars is 12 in step 510. It determines whether error values of steps 509 and 510 are within a range of the error correction in step 511. In case of being impossible of the correction, steps 506 and 507 are performed. If the error values of steps 509 and 510 are within a range of the error correction, it determines whether the error is below four symbologies in step 512. It performs an Exclusive-OR operation on values of the bar thus obtained to produce a value of syndrome and find a value of the error location by use of the coefficient value of the index, in step 513. The error is corrected by use of a Recursive Extension method and an Inverse Transform method in step 514. In step 515, it determines whether the error is corrected in step 514. If the error is not corrected, steps 506 and 507 are implemented. If the error correction is completed, the compressed information relative to the information on a data region is decoded, and a sorting message is transferred to the sorter, in step 516. The automatic sorting is implemented in step 517. The used memory is erased, and the system is standing by ready to read the next bar code, in step 517.

Equation 6

Multiplication operation, $GF_{MUL}(Temp_1, s)$ 1) if $Temp_1=0$, $GF_{MUL}(Temp_1, s)=0$ 2) if $s=0$, $GF_{MUL}(Temp_1, s)=0$ 3) $GF_{MUL}(Temp_1, s)=(Temp_1-1)+(s-1)+1$ if $GF_{MUL}(Temp_1, s) \geqq GF_{MUL}$, $GF_{MUL}(Temp_1, s)=(Temp_1, s)-(GF_{MUL}+1)$ Division operation, $GF_{DIV}(Temp_1, s)$ 1) if $Temp_1=0$, $GF_{DIV}(Temp_1, s)=0$ 2) if $s=0$, Error 3) $GF_{DIV}(Temp_1, s)=(Temp_1-1)+(s-1)+1$ if $GF_{DIV}(Temp_1, s)<0$, $GF_{MUL}(Temp_1, s)=GF_{MUL}(Temp_1, s)-(GF_{MUL}-1)$ Equation 7

$$Temp[j] = \sum_{j=0}^{D_1/3}\left[\sum_{i=0}^{2} b_i 4^J - 1\right] \quad \text{Equation 7}$$

$\therefore$ if $b_i=4$, $Temp[j]=64$, $D_1$=total length of received symbology

Error Symbology (value): if $b_i=4$, $Temp[j]=64$ $$Syndrome[s] = \sum_{s=0}^{GF_{sum}-1}\sum_{i=0}^{D_1/3}[GF_{sum}(GF_{sum}(Temp_{2[s]}, D_1)s)D_0]$$

$\Theta_{2[s]}|_i=0$; 삭제하여주십시오(모든 초기치를 0으로 함)에 대한 표현입니다.

Exclusive-$OR_{(16)}$ $$Temp2[s] \quad (1)$$

$$GF_{sum}(Temp_{2[s]}, D_i) \quad (2)$$

$$GF_{MUL}(GF_{sum}(Temp_{2[s]}, D_i)s) \quad (3)$$

In step 513, in order to produce the syndrome value and search the error location value, it performs an Exclusive-OR operation on the equation 6. There are addition, division and multiplication in the Recursive Extension method and the Inverse Transform method, but the addition operation is identical to the encoding process, and the function for the addition and division is performed by use of the equation 6. In addition, the syndrome value operation is performed by use of the equation 7.

As the result of step 512, if five symbologies are error, there is a case that one bar among three bars consisting of the symbology is error. In step 520, (0, 1, 2, 3) are substituted for the value of one error bar among the symbologies. In case of substituting 0 for the value of each bar, the syndrome value is produced by substituting with 0, and the location of the error is calculated, in step 521. The Recursive Extension method and the Inverse Transform method are implemented in step 522. In case of substituting 1 for the value of each bar, the syndrome value is produced by substituting the value with 1, and the location of the error is calculated, in step 523. The Recursive Extension method and the Inverse Transform method are implemented in step 524. In case of substituting 2 for the value of each bar, the syndrome value is produced by substituting the value with 2, and the location of the error is calculated, in step 525. The Recursive Extension method and the Inverse Transform method are implemented in step 526. In case of substituting 3 for the value of each bar, the syndrome value is produced by substituting the value with 3, and the location of the error is calculated, in step 527. The Recursive Extension method and the Inverse Transform method are implemented in step 528. The error is corrected by determining whether there is one value of bar which is coincided with digit of the value obtained from step 515.

Figure 6A:
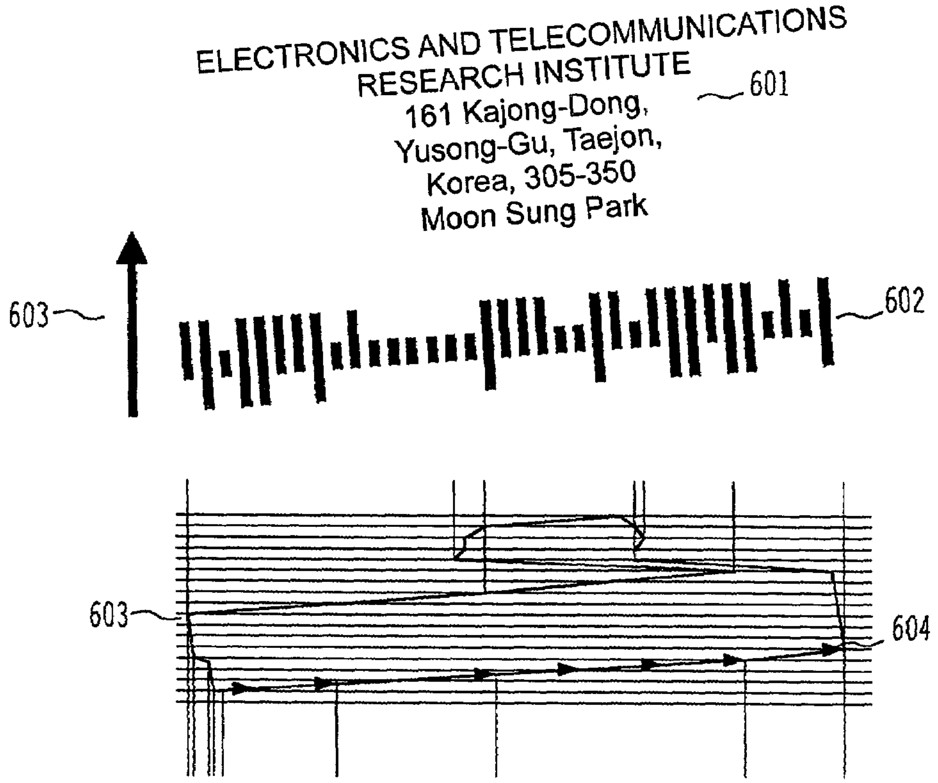
FIGS. 6A and 6B are views illustrating a method for evaluating coordinate values depending upon a left and right slope of bar code by examining a lower end point of an image to obtain a feature value of the 4-state bar code according to the present invention.
Figure 6B:
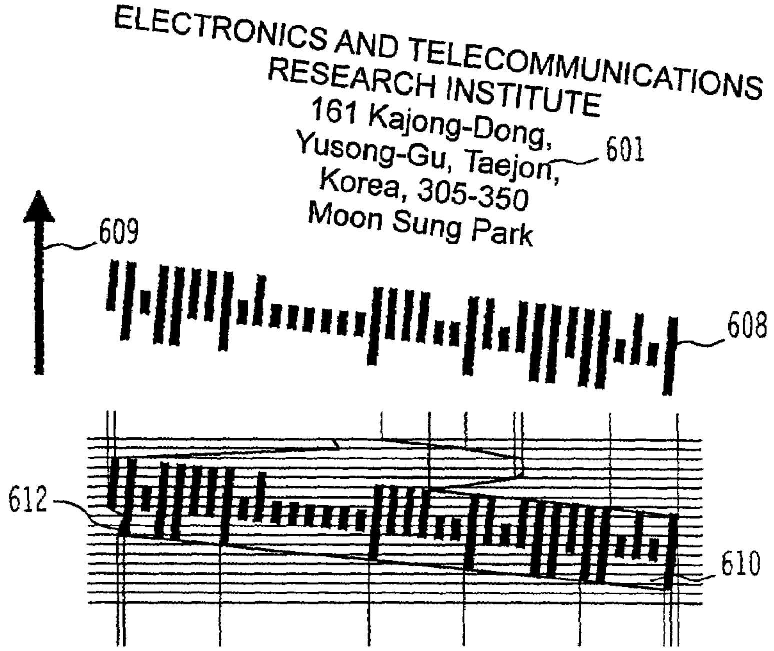

FIGS. 6A and 6B are views illustrating a method for evaluating coordinate values depending upon a left and right slope of bar code by examining a lower end point of an image to obtain a feature value of the 4-state bar code according to the present invention. The 4-state bar code according to the present invention is printed on a lower portion of a postal address region, and in case that the bar code is sloped in a left or right direction, a method for acquiring the coordinate values of the image and a method for calculating the slope value will now be explained herein.

FIG. 6A shows a procedure (indicated by an arrow 603) of binarizing the image from the lower end point of the image. The postal address region consists of a postal address 601 and a 4-state bar code 602. If the original image is serached from the lower end point, since a difference between a length of a horizontal line and a length of the bar code is longer than ½ of total length of the horizontal line, $x_i$ value of the location of the firstly obtained pixel is moved toward an upper end point to evaluate a minimum and maximum value of a coordinate value x corresponding to a coordinate value y of a vertical axis, and maximum values 604 is Ad calculated excepting for a variation decreased value of the maximum value of x. In other words, the process is to calculate average value 605 of the slope angle as a slope value every section by evaluating the coordinates of the increased maximum value and the y values of size value of the decreased range.

FIG. 6B shows a procedure (indicated by an arrow 609) of binarizing the image from the lower end point of the image. The postal address region consists of a postal address 607 and a 4-state bar code 608. If the original image is searched from the lower end point, since a difference between a length of a horizontal line and a length of the bar code is shorter than ½ of total length of the horizontal line, $x_1$ value of the location of the firstly obtained pixel is moved toward an upper end point to evaluate a minimum and maximum value of a coordinate value x corresponding to a coordinate value y of a vertical axis, and maximum values 610 is calculated excepting for a variation increased value of the maximum value of x. In other words, the process is to calculate average value 611 of the slope angle as a slope value every section by evaluating the coordinates of the decreased maximum value and the y values of size value of the increased range. In the above process, it determines whether the $x_1$ value is within a range of a thickness of the bar and space value when moving toward the upper end point.

Figure 7:
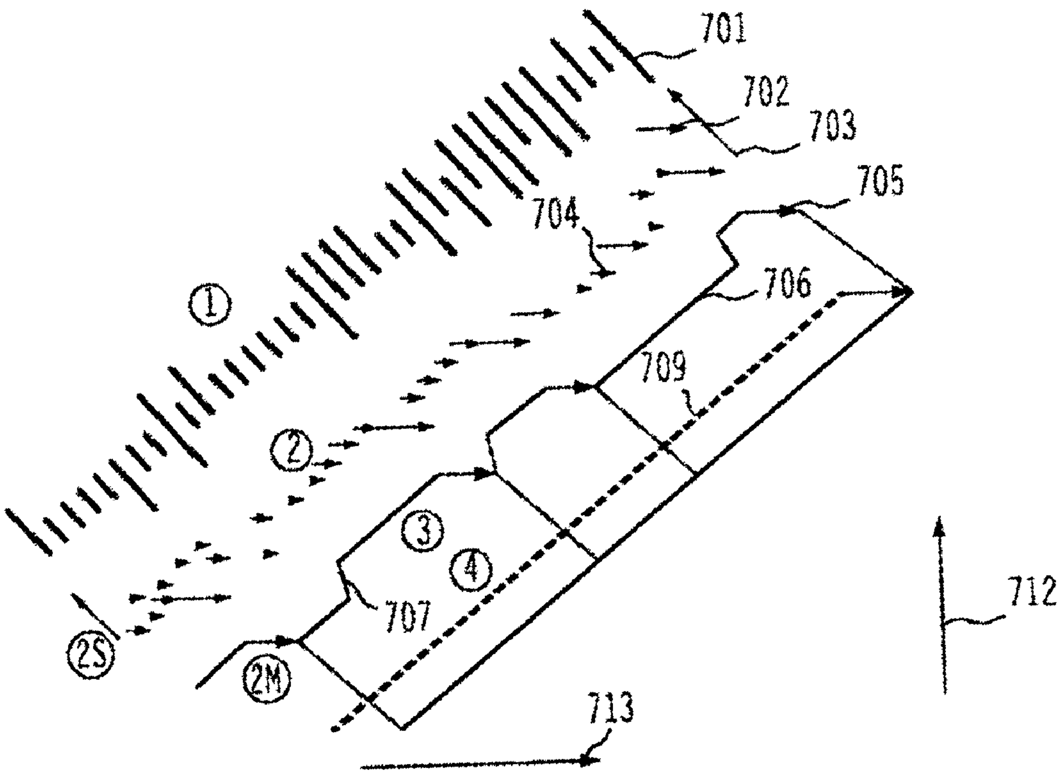
FIG. 7 is a view illustrating a method for evaluating coordinate values depending upon a slope of a bar code by examining from a lower end point of an image to an upper end point to obtain a feature value of the 4-state bar code according to the present invention.

FIG. 7 is a view illustrating a method for evaluating coordinate values depending upon a slope of a bar code by examining from a lower end point of an image to an upper end point to obtain a feature value of the 4-state bar code according to the present invention. The 4-state bar code according to the present invention is printed on a lower portion of a postal address region, and in case that the slope of the bar code is very large, a method for acquiring the coordinate values of the image and a method for calculating the slope value will now be explained herein.

The process acquires coordinate values by use of the same method as that of FIG. 6. The first slope angle is evaluated by use of a case that a varying range of the maximum value is large and a case that a varying range of the maximum value is small, and a weight value is produced on the basis of an distribution value associated with the variation of the thickness of the bar and space values by use of value $_t$ of 790 through a tracking process of the tracker bar. Simultaneously, the 4-state bar code is accurately sorted, and the value of slope angle, which is to be finally, used can be evaluated.

Figure 8A:
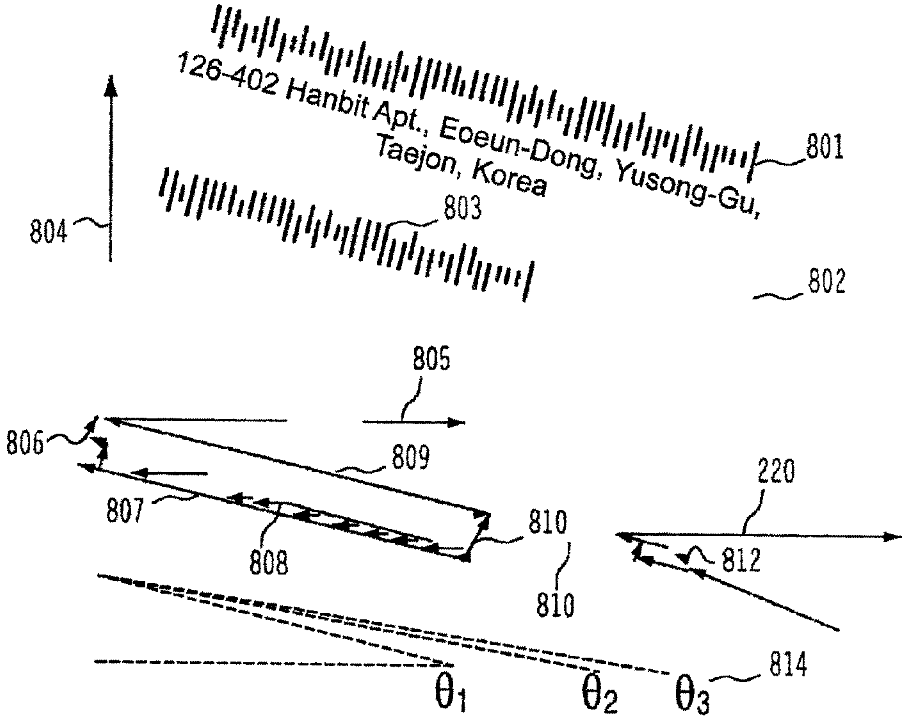
FIGS. 8A and 8B are views illustrating a method for evaluating a value of bar by producing two center axes for coordinate values depending upon a slope of the 4-state bar code according to the present invention.
Figure 8B:
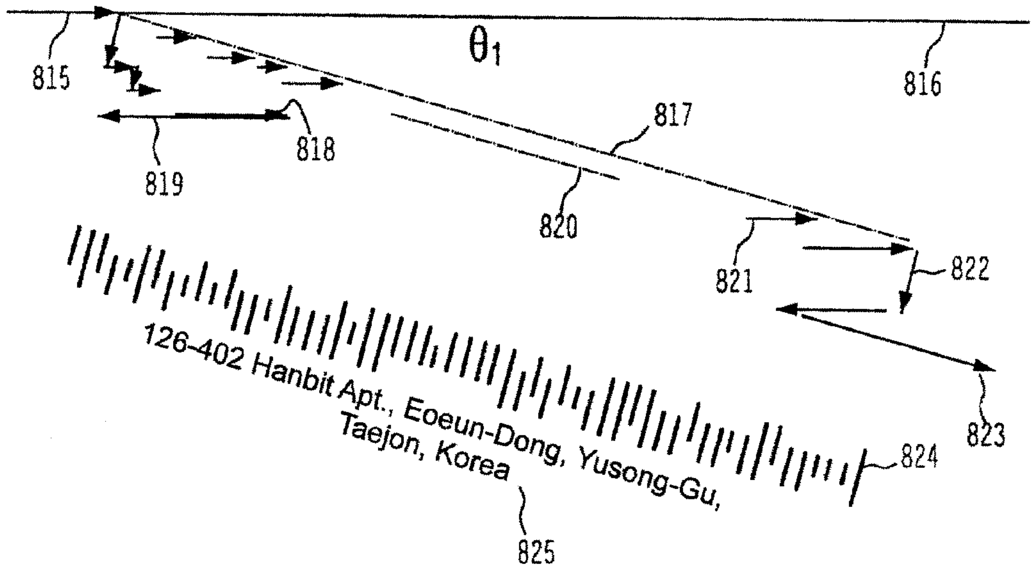

FIGS. 8A and 8B are views illustrating a method for evaluating a value of bar by producing two center axes associated with the coordinate values depending upon a slope of the 4-state bar code according to the present invention. The 4-state bar code according to the present invention is printed on an upper or lower portion of a postal address region, and in case that there are pixels regarded as a noise in course of calculating coordinate values for minimum and maximum values and the slope angle, a method for calculating the 4-state bar code region and the slope value will now be explained herein.

Referring to FIG. 8A, when the bar code is searched from the lower end point to the upper end point, a zip code 802 may be an obstacle to calculate the slope of the bar code. Since the sloped feature may be obtained in course of performing the process shown in FIG. 6 (indicated by arrows 812 and 813), the thickness of the bar and the feature of the stop bar are compared, and thus inconsistent coordinate values are disregarded. If the process of FIG. 8A will be omitted, since the slope value is set to angles θ2 and θ3 (indicated by an arrow 814), it may be not read. Therefore, a method for comparing the feature value for a size of direction of the bar is applied. If the sloped feature is obtained in the process of FIG. 6, the thickness of the start bar is approximately compared with the thickness of the stop bar.

FIG. 8B shows one example of a method for acquiring the slope coordinate values of the 4-state bar code in case of searching the code bar from the upper end point to the lower end point. As explained with reference to FIG. 6, since the slope direction is predicted, by employing a method acquiring a thickness of the bar and coordinate values of maximum values and a method for examining diverse image, the bar code is identified by use of the feature value of the start bar and a thickness (indicated by an arrow 815) of the bar. In case that the value of a portion (indicated by an arrow 817) is gradually decreased, the range of the bar code is identified by comparing a height of the stop bar. A method for evaluating an average slope value based on the slope of each section by producing coordinates of maximum value is shown as one example herein.

Figure 9:
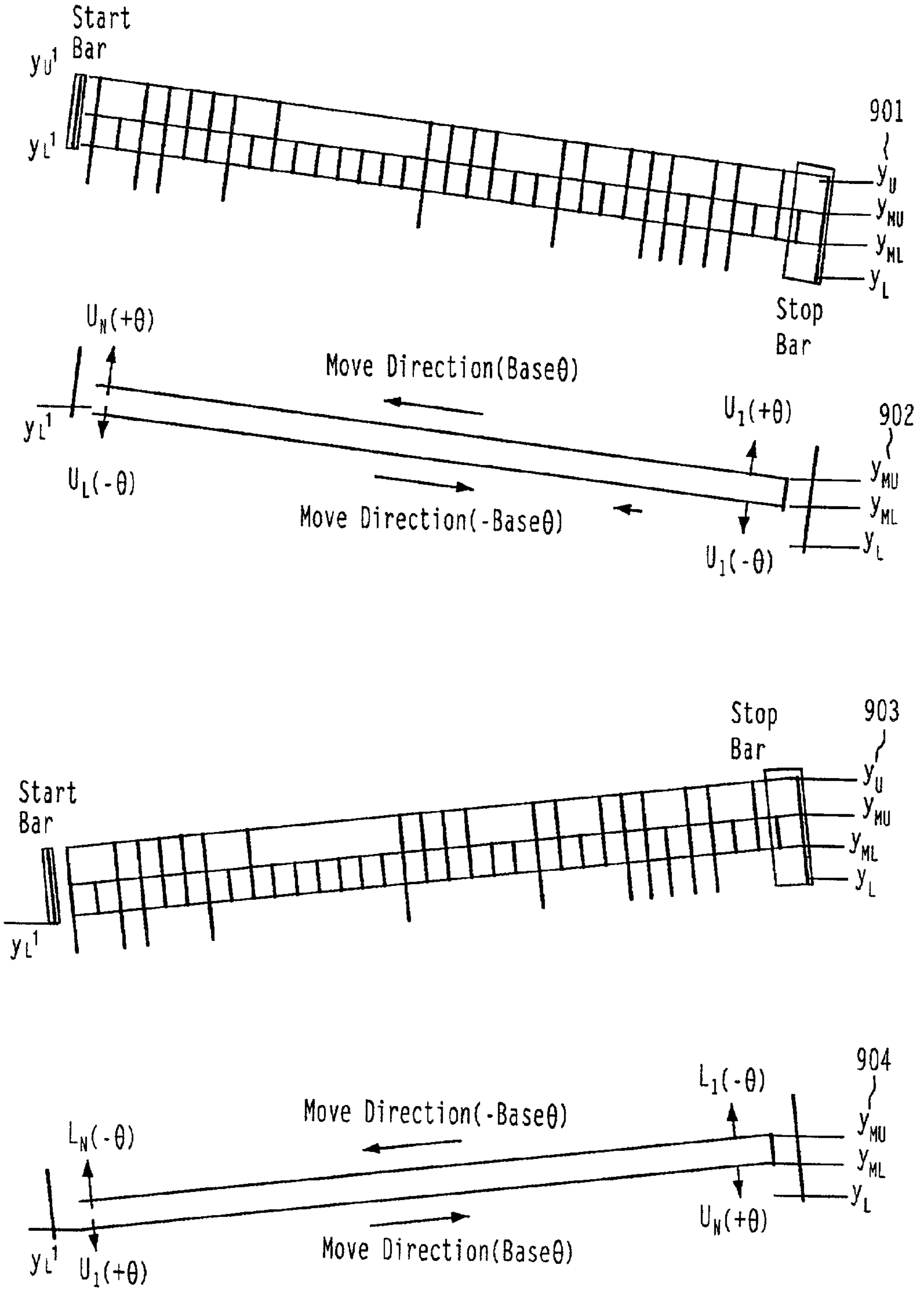
FIG. 9 is a view illustrating a method for calculating a value of a bar by use of the method for reading a 4-state bar code according to the present invention.

FIG. 9 is a view illustrating a method for calculating a value of a bar by use of the method for reading a 4-state bar code according to the present invention. By the method for reading a 4-state bar code according to the present invention, after evaluating the slope value and the bar code region, it determines whether the start bar and the stop bar exist. And then, in order to facilitate the calculation of the value of bar, the center axes of the upper and lower ends of the tracker bar are produced. The method for calculating the value of the bar will now be explained. If the slope value is calculated and the bar code image region is extracted (indicated by arrows 901 and 903), the coordinate values for values YU, YL, YMU and YML are evaluated by use of total height F which is a feature of the stop bar and coordinate values of the tracker (T) bar. The coordinate for the values YU1 And YL1 of the start bar is evaluated based on the result.

The slope value is calculated, and two or more coordinate values are set on each tracker bar by use of reference values for a thickness and spacing of the bar. An upper value (U1) and a lower value (L1) are calculated by use of coordinate values for the sloped direction.

According to the 4-state bar code printing and reading system of the present invention, much more information can be recorded, relative to the existing bar code for effectively executing the process of automatically sorting the mail pieces. Since the length of the bar code is shortened and, if necessary, it is unnecessary to print two bar codes, the cost for printing bar code is reduced. The coordinate values and the bar code region for evaluating the slope value can be acquired in the course of image pretreatment. The bar code of which the error correction is needed can be effectively sorted. In addition, the error correcting range may be expanded. Therefore, there is an excellent advantage of facilitating the automatic sorting process.

According to the typical method, if the disperse image exists, all image is examined to extract the bar code region. However, the present invention examines all image of bar codes, without eliminating the disperse image. The values of the bars can be easily calculated based on the coordinate values, according to the method of producing two center axes, thereby improving the reading performance.

In addition, the 4-state bar code can be read by use of the image obtained by CMOS-CCD, without using expensive bar code reader used in personal computer. If it is applied to PDA or mobile phone, the collection of the distribution-related information is effectively executed.

The forgoing embodiment is merely exemplary and is not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A 4-state bar code printing system comprising:

a bar code information acquiring section for acquiring or inputting a mail piece sorting information;

an information recorded density enhancing section for evaluating a value of a character to produce values of bars, by using of a compression method depending upon a type of the information and digit, which are determined by the bar code information acquiring section;

an input information encoding section for arranging the values of the bars produced by the information recorded density enhancing section in order of values of bars of the 4-state bar code, dividing the values of the bars into groups as a unit of three bars in order of the inputted information, and if the values is not divided into groups as a unit of three bars, adding the number of insufficient bars to the values, to allow the values of the bars to be a multiple of 3;

an error correcting codeword producing section for producing an error correcting codeword by use of an Exclusive-OR bit operation method, based on the result of the information encoding section the input value of an error correcting level, of which a coefficient value of a index function is standardized; and a print frame producing section for arranging the error correcting codeword produced from the error correcting codeword producing section and the data produced from the information recorded density improving section in order of a start bar, a data, an error correcting codeword, and a stop bar, to print a 4-state bar code print font on a mail piece.

2. The system as claimed in claim 1, wherein the information recorded density enhancing section divides the inputted or acquired information into a numeric character, an alphabetic character, and a Korean alphabetic character, employs a modulo 64 operation method in case of the numeric character, a modulo 27 operation method in case of the alphabetic character, or a modulo 50 and 256 operation method in case of the Korean alphabetic character, by applying a proper rule, based on a value of a 4-state bar code reference table and a digit, thereby enhancing an information recorded density.

3. A 4-state bar code printing system comprising:

means for acquiring an image of a bar code from a mail piece;

image transforming means for transforming the acquired image into a binary image information, and transferring a coordinate information for interpreting a bar code image to image feature value acquiring means;

the image feature value acquiring means for acquiring a directional coordinate value for calculating a slope value of the bar code, and a coordinate value associated with a bar code region by a feature value of the bar code, based on the coordinate information produced from the image feature value;

bar code region extracting means for evaluating a first slope value based on the binary image information obtained by the image transforming means and the slope value of the bar code obtained by the image feature value acquiring means, and determining a searching region of a tracker bar code based on the production of a correct final slope value by tracking a location of a tracker bar;

information sorting means for extracting a uniform region by calculating a distribution of thickness of the bars and space values, among the information on the feature value of the bar determined by the bar code region extracting means, or extracting the feature value of the bar by calculating a weight value based on a variation of the thickness of the bar and the space value acquired when tracking the tracker bar, and storing the coordinate value for reading the bar code;

bar region discriminating means for examining a start bar and a stop bar based on the coordinate value obtained by the bar feature value extracting means, producing a center axis on an upper and lower end of the tracker bar by applying a predetermined slope angle, if the bar is sloped, and producing a bar location information by evaluating the coordinate value for extracting the value of the bar;

erasure error detecting means for calculating number of location of erased bar based on the result obtained by the bar feature value extracting information sorting means, and identifying existence of an erased error;

substitution error detecting means for 1) extracting the value of the bar by use of only a coordinate value of a space, except for the coordinate region of a white bar, when extracting the value of the bar, based upon the values extracted by the bar region discriminating means, 2) after sorting a numeric, alphabetic, and Korean alphabetic letter applied region, determining whether the value of the bar is deviated from a symbol feature value, and 3) if the error exists, detecting the number and position of the error;

an error correcting codeword comparing section for, if a service pattern value corresponding to the value of the bar produced by the bar region discriminating means exists, comparing a length of the bar with that of the bar of the corresponding service pattern, determining whether the value of the service pattern does not exist and only mail piece automatic sorting code exists, and if the length of the bar coincides with that of the bar of the corresponding service pattern, classifying the bar into a data region and an error correcting codeword region, and after encoding the bar as a data value, determining whether the produced value coincides with the read error correcting codeword; and information frame codeword interpreting means for, if at the error correcting codeword comparing means the produced value coincides with the read error correcting codeword, interpreting the data information to perform an automatic sorting process of the mail piece, and storing the read result to be accessed.

4. The system as claimed in claim 3, wherein the image acquiring means comprises a CCD camera, a CCD scanner, and a CMOS-CCD.

5. The system as claimed in claim 3, further comprising a color image processing section for, prior to performing the binary coding process, if the acquired image is a color image, transforming the image to further obtain information of black and white pattern by use of a color signal.

6. The system as claimed in claim 3, further comprising:

error correcting range comparing means for, if an error is detected by the erasure error detecting means or the substitution error detecting means, comparing a position and number information of an erasure error and a number information of a substitution error with the error correcting range, to determine whether the error correction is possible; and error correcting means for, if the correct is impossible, producing an unreadable message to divide it into a sorting reject and store the read result, and if the correction is possible, performing the error correction.

7. A method for printing 4-state bar code, comprising the steps of:

1) acquiring a mail piece sorting information from a mail piece, and storing and determining the mail piece sorting information;

2) evaluating a value of a character to produce values of bars, by use of a compression method depending upon a type of the information and digit;

3) arranging the values of the bars produced by the step 2 in order of values of bars of the 4-state bar code, dividing the values of the bars into groups as a unit of three bars in order of the inputted information, arid if the values is not divided into groups as a unit of three bars, adding the number of insufficient bars to the group, to allow the values of the bars to be a multiple of 3;

4) producing an error correcting codeword by use of an Exclusive-OR bit operation method, based on the result of the step 3, of which a coefficient value of a index function is standardized; and 5) arranging the error correcting codeword produced from the step 4 and the data produced from the step 2 in order of a start bar, a data, an error correcting codeword, and a stop bar, to print a 4-state bar code print font on a mail piece.

8. The method as claimed in claim 7, wherein the step for compressing a numeric information, the step comprising the steps of:

a) substituting a numeric information into a decimal number b) dividing the substituted value by $64^3$;

c) setting an integer of the result obtained from the step item b to a compressed data value 1;

d) evaluating a difference between the value of the step c and the value of the step b, and dividing the difference by $64^2$; and f) applying values obtained by repeating the same procedures as those of step c and d using $64^1$ and $64^3$.

9. The method as claimed in claim 7, wherein the step for compressing an alphabetic information, the step comprising the steps of:

a') reading an alphabetic character to know the number of characters and an alphabetical order of each character;

b') substituting the alphabetic information into decimal number using a formula $V_n=b_n27^n+\ldots+b_3 27^3+b_2 27^2+b_1 27^1+b_0 27^0$, wherein n is a positive integer corresponding to the number of characters, and b is a positive integer corresponding to the alphabetic order of each character;

c') setting $1^{st}$ and $2^{nd}$ digits value to a first bar code character value by use of a 16 modulo method based on a maximum value, at the value $V_n$ obtained from the step b';

d') dividing the value $V_n$ obtained from the step b' into groups consisting of 3-digits, except for the $1^{st}$ and $2^{nd}$ digits, and evaluating a value of a quotient calculated by a 64 modulo method; and e') evaluating a value of the bar code by arranging values obtained from the steps c' and d' in order.

10. The method as claimed in claim 7, wherein the step for compressing a Korean alphabetic information, the step comprising the steps of:

a") knowing a Korean Alphabet completion character to obtain the number of characters and alphabetical order;

b") substituting the character information into decimal number based on the information and a value of bar code character obtained in step a";

c") dividing a value of $1^{st}$ to $4^{th}$ digits from the decimal numbers obtained from the step b" by $256^2$, to obtain an integer value of the result;

d") multiplying a difference between the actual value and the integer value obtained from the step c" by 256;

e") dividing the result obtained from the step d" by 256, and repeating the steps c" and d";

f") dividing the remaining digits obtained from the step b" by 256, and evaluating a value by repeating the steps c" arid d"; and g) evaluating a value of bar code by arranging the values obtained from the step f" in order of 4-state 6 bar.

11. The method as claimed in claim 8, wherein the step of producing the error correcting codeword is performed by a following equation, and $$g(x)=(1+x)(1+x^2)(1+x^3)(\mathbf{130}\ x^4)=x^4+\alpha^{19}x^3+\alpha^{41}x^2+\alpha^{24}x+\alpha^{10}$$

the step comprises the steps of:

producing a hexadecimal binary table associated with values of GF(64) and a reference table in which hexadecimal values are arranged by coefficient values index α, storing the tables to a memory, and performing an hexadecimal Exclusive-OR operation by use of following tables 1 and 2 to produce an error correcting codeword.

TABLE 1

| Index | 16 Bit | HEX | EXP |
|---|---|---|---|
| 0 | (000000) | 0x00 | NULL |
| 1 | (100000) | 0x20 | $\alpha^0$ |
| 2 | (010000) | 0x10 | $\alpha$ |
| 3 | (001000) | 0x08 | $\alpha^2$ |
| 4 | (000100) | 0x04 | $\alpha^3$ |

TABLE 2

| Bit | HEX | BTI | EXP | Index |
|---|---|---|---|---|
| (000000) | 0x00 | 0 | −1 | −1 |
| (000001) | 0x01 | 1 | $\alpha^5$ | 5 |
| (000010) | 0x02 | 2 | $\alpha^4$ | 4 |
| (000011) | 0x03 | 3 | $\alpha^{10}$ | 10 |
| . | . | . | . | . |
| . | . | . | . | . |
| . | . | . | . | . |
| (111100) | 0x3c | 60 | $\alpha^{18}$ | 18 |
| (111101) | 0x3d | 61 | $\alpha^{40}$ | 40 |
| (111110) | 0x3e | 62 | $\alpha^{56}$ | 56 |
| (111111) | 0x3f | 63 | $\alpha^{58}$ | 58. |

12. A method for reading a 4-state bar code, the method comprising the steps of:

1) acquiring an image of a bar code from a mail piece;

2) transforming the acquired image into a binary image information, and evaluating coordinate values for a minimum value and a maximum value based on a horizontal line of the mail piece;

3) acquiring a directional coordinate value for calculating a slope value of the bar code, and a coordinate value for a bar code region by a feature value of the bar code, based on the coordinate information produced from the step 2;

4) determining an examining region of a tracker bar code based on the binary image information and the slope value of the bar code, each obtained by the steps 2 and 3;

5) extracting a uniform region by calculating a distribution of thickness of the bar and a space value, among the information on the feature value of the bar, and storing the coordinate value for reading the bar code;

6) examining a start bar and a step bar based on the coordinate value obtained from the step 5, producing a center axis on an upper and lower end of the tracker bar by applying a predetermined slope angle, if the bar is sloped, and producing a bar location information by evaluating the coordinate value for extracting the value of the bar;

7) calculating number of location of erased bar based on the result obtained from the step 6, and identifying existence of an erased error;

8) extracting the value of the bar by use of only a coordinate value of a space except for a coordinate region of a white bar, when extracting the value of the bar, based upon the values extracted from the step 6, after sorting the numeric, alphabetic, and Korean alphabetic letter applied region, determining whether the value of the bar is deviated from a symbol feature value, and if the error exists, detecting the number and position of the error;

9) if a service pattern value corresponding to the value of the bar produced from the step 6 exists, comparing a length of the bar with that of the bar of the corresponding service pattern, determining whether the value of the service pattern does not exist and only mail piece automatic sorting code exists, and if the length of the bar coincides with that of the bar of the corresponding service pattern, classifying the bar into a data region and an error correcting codeword region, and after encoding the bar as a data value, determining whether the produced value coincides with the read error correcting codeword; and 10) if the produced value coincides with the read error correcting codeword at the error correcting codeword comparing means, interpreting the data information to perform an automatic sorting process of the mail piece, and storing the read result to be accessed.

13. The method as claimed in claim 12, further comprising the steps of:

11) setting an image region of a postal address and a bar code region, before the image is obtained from the mail piece, dividing the image region into two equal upper and lower parts, and examining the image region from the upper to the lower or from the lower to the upper;

12) if a black pixel is found on a horizontal line in course of searching the image on the mail piece, evaluating a difference between a length of the bar and a length of a horizontal line to predict a sloped direction of the bar code based on the found location value, and comparing a thickness of the bar and a space value to identify the bar code; and 13) comparing a bar code region, which is found when examining the image of the postal address, with coordinate values for the start and stop bars.

14. The method as claimed in claim 13, further comprising the steps of:

14) in course of searching the horizontal line based on the black pixel, storing minimum and maximum values of the coordinate values of the horizontal line, and determining whether the maximum and minimum values are increased or decreased by comparing them with previous data;

15) if the sloped direction of the bar is determined from the step 14, selecting one among the maximum and minimum values to sort the coordinate values depending upon the increasing or decreasing state of the value; and 16) calculating a sloped angle based on the coordinate value (x, y) for a range of the sorted coordinate values, and evaluating an average value of the sloped angle value to obtain a slope angle value.

15. The method as claimed in claim 14, further comprising the steps of:

17) storing the obtained image to a temporary memory;

18) producing two center axes on an upper end and a lower end of a tracker bar through the slope value of the coordinate values of the start and stop bars in the 4-state bar code range based on the image stored in the temporary memory and the evaluated coordinate value and slope value;

19) checking a range with uniform thickness of the bar and uniform space value to calculate an average thickness of the bar and an average space value, or in case that the thickness of the bar and the space value are varied, extracting the tracker bar to produce a weight value for a corresponding coordinate by use of a distribution value of the varied value, and in case that the bar is erased, evaluating the number of the erased bar and the space value based on a final slope angle produced by tracking the tracker bar;

20) setting a coordinate by use of a slope of the coordinate value with the bar positioned, an average thickness of the bar, and an average apace value based on the two center axes, searching the coordinate up and down to produce a value for calculating a value of the bar;

21) if the black pixel does not exist at a position of the coordinate value in the step 20, determining whether a pixel value of the black pixel exists by dividing the center axis of the coordinate value into two equal parts, and if the black pixel does not exist, determining the bar is erased and producing a location value of the bar; and 22) calculating the location value of the erased bar obtained from the step 21, and storing the location value of the erased bar as '4' to identify that the bar corresponding to the location is error in course of error correction.

16. The method as claimed in claim 12, further comprising the steps of:

23) identifying the number of the bar detected as an error and the number of symbologies; and 24) if the number of the bar detected as an error is below 13 and five symbologies are detected as an error in the step 23, setting a symbology as an error, of which two bars are error, by searching one symbology of which one bar is error and the other symbology of which two bars are error, and after a value of the symbology, of which one bar is error, by substituting 0, 1, 2 and 3 for the location value of the error, calculating a value of the symbology for each error bar to perform the error correction.

17. The method as claimed in any one of claims 12 to 16, further comprising the steps of:

25) if a process off reading the bar code is normally executed, interpreting a content of compressed information based on the information of a recorded data region, to automatically sort the mail pieces and simultaneously storing the corresponding information;

26) initializing a binary image of the temporary memory used when reading the mail piece, a coordinate data, and a temporary data stored for correcting the error; and 27) if there are a plurality of 4-state bar codes, dividing equally the temporary memory region into parts corresponding to the number of the 4-state bar codes, to read all of the 4-state bar codes.

* * * * *